(12) United States Patent
McFadden

(10) Patent No.: US 7,360,533 B2
(45) Date of Patent: *Apr. 22, 2008

(54) SPEED COOKING OVEN

(75) Inventor: David H McFadden, Lexington, MA (US)

(73) Assignee: Turbochef Technologies, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/098,280

(22) Filed: Apr. 4, 2005

(65) Prior Publication Data

US 2005/0217503 A1 Oct. 6, 2005

Related U.S. Application Data

(63) Continuation of application No. 10/614,479, filed on Jul. 7, 2003, now Pat. No. 6,874,495.

(60) Provisional application No. 60/615,888, filed on Oct. 5, 2004, provisional application No. 60/614,877, filed on Sep. 30, 2004, provisional application No. 60/394,216, filed on Jul. 5, 2002.

(51) Int. Cl.
*F24C 15/32* (2006.01)
*A21B 1/26* (2006.01)
*H05B 6/80* (2006.01)

(52) U.S. Cl. .............................. 126/21 A; 126/273 R; 219/400; 219/681

(58) Field of Classification Search .............. 126/19 R, 126/21 R, 21 A, 273 R; 219/400, 399, 405, 219/398, 391, 681; 99/474, 475
See application file for complete search history.

(56) References Cited

U.S. PATENT DOCUMENTS

| | | | |
|---|---|---|---|
| 2,704,802 A | | 3/1955 | Blass et al. |
| 3,210,511 A | | 10/1965 | Smith |
| 3,828,760 A | * | 8/1974 | Farber et al. .............. 126/21 A |
| 4,154,861 A | * | 5/1979 | Smith ........................ 426/466 |
| 4,283,614 A | * | 8/1981 | Tanaka et al. .............. 219/681 |
| 4,327,279 A | * | 4/1982 | Guibert ...................... 219/400 |
| 4,337,384 A | | 6/1982 | Tanaka et al. |
| 4,338,911 A | * | 7/1982 | Smith ........................ 126/21 A |
| 4,409,453 A | | 10/1983 | Smith |
| 4,431,889 A | | 2/1984 | Saponara et al. |
| 4,464,554 A | | 8/1984 | Bakanowski et al. |
| 4,480,164 A | | 10/1984 | Dills |
| 4,752,268 A | * | 6/1988 | Kataoka et al. .............. 445/66 |
| 4,965,435 A | * | 10/1990 | Smith et al. ................ 219/388 |
| 5,166,487 A | | 11/1992 | Hurley et al. |
| 5,369,250 A | | 11/1994 | Meredith |
| 5,401,940 A | * | 3/1995 | Smith et al. ................ 219/679 |

(Continued)

FOREIGN PATENT DOCUMENTS

DE 2557867 A1 * 6/1977 .............. 126/21 A (Continued)

*Primary Examiner*—Josiah C. Cocks
(74) *Attorney, Agent, or Firm*—Kilpatrick Stockton LLP

(57) ABSTRACT

A speed cooking oven is disclosed comprising a cooking cavity, a controller, thermal heating source, blower assembly, air directing means and a vent assembly. Hot air is circulated by the blower motor assembly into the oven cavity where the hot air is directed in a maimer wherein a conflicting, colliding turbulent gas flow is directed at a food product providing for the rapid cooking of food products.

8 Claims, 16 Drawing Sheets

U.S. PATENT DOCUMENTS

| | | | |
|---|---|---|---|
| 5,676,870 A * | 10/1997 | Wassman et al. | 219/400 |
| 5,717,192 A * | 2/1998 | Dobie et al. | 219/681 |
| 5,825,000 A | 10/1998 | Jun | |
| 6,058,924 A * | 5/2000 | Pool et al. | 126/21 A |
| 6,060,701 A * | 5/2000 | McKee et al. | 219/681 |
| 6,369,360 B1 * | 4/2002 | Cook | 219/388 |
| 6,399,930 B2 | 6/2002 | Day et al. | |
| 6,403,937 B1 * | 6/2002 | Day et al. | 219/681 |
| 6,437,303 B1 | 8/2002 | Dorr et al. | |
| 6,874,495 B2 * | 4/2005 | McFadden | 126/21 A |
| 2004/0118392 A1 | 6/2004 | McFadden | |
| 2004/0211765 A1 | 10/2004 | McFadden | |
| 2004/0216732 A1 | 11/2004 | McFadden | |

FOREIGN PATENT DOCUMENTS

| | | |
|---|---|---|
| EP | 0429822AJ | 6/1991 |
| JP | 63-317068 A | 12/1988 |
| WO | WO2004/014139 | 2/2004 |

* cited by examiner

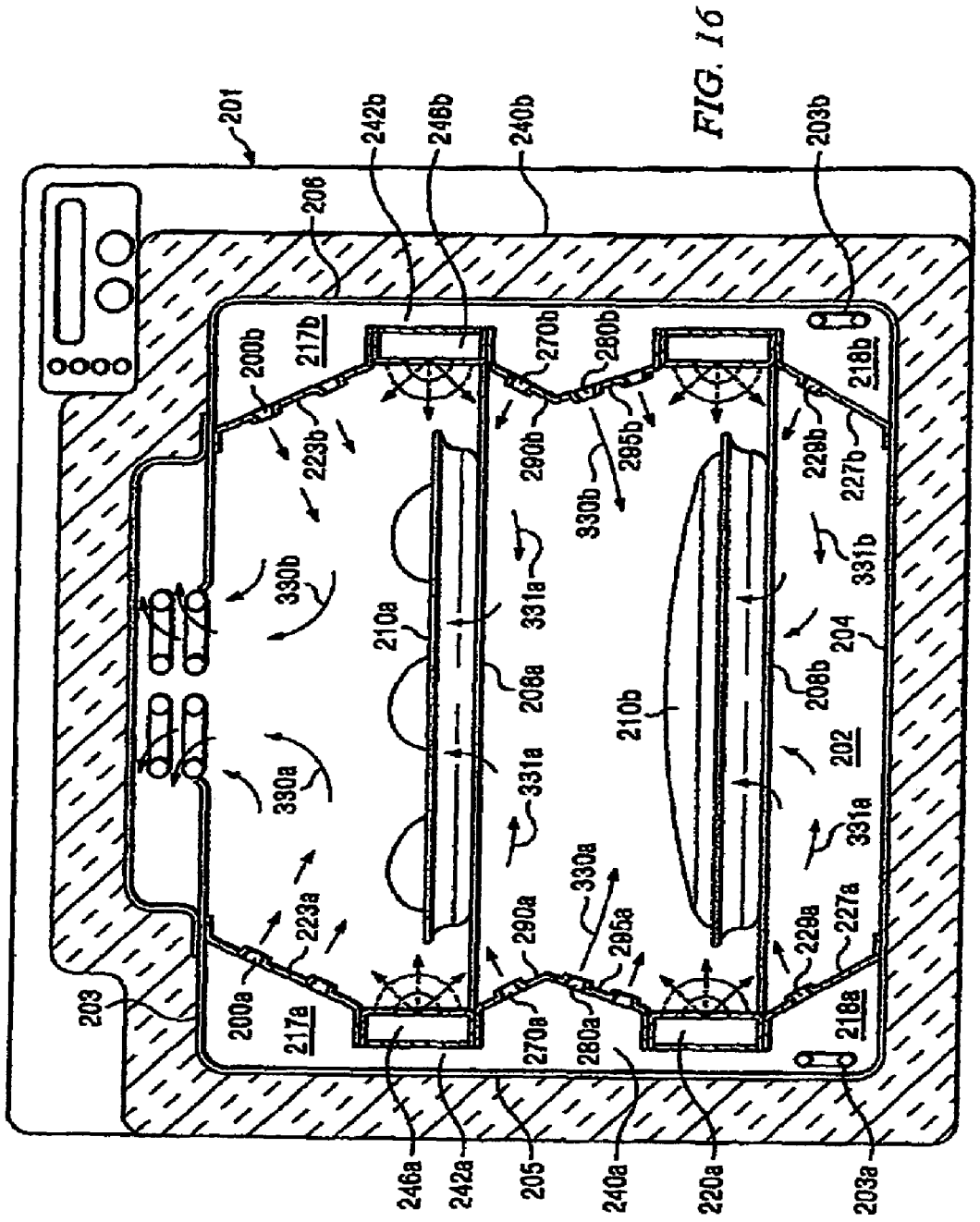

SPEED COOKING OVEN

CROSS REFERENCE TO RELATED APPLICATIONS

The present application is a continuation of U.S. patent application Ser. No. 10/614,479, filed Jul. 7, 2003, entitled "SPEED COOKING OVEN," to issue on Apr. 5, 2005 under U.S. Pat. No. 6,874,495, which claims the benefit of U.S. Provisional Application No. 60/394,216, filed Jul 5, 2002, entitled "RAPID COOKING OVEN.".

The present application is related to U.S. Provisional Application No. 60/550,578, filed Mar. 5, 2004, entitled "SPEED COOKING CONVEYOR OVEN; related to U.S. Provisional Application No. 60/513,110, filed Oct. 21, 2003, entitled "SLOTTED ANTENNA;" related to U.S. Provisional Application No. 60/513,111, filed Oct. 23, 2003, entitled "MICROWAVE ANTENNA COVER FOR RAPID COOKING OVEN;" related to U.S. Provisional Application No. 60/614,877, filed Sep. 30, 2004, entitled "SLOT ANTENNA;" and related to U.S. Provisional Application No. 60/615,888, filed Oct. 5, 2004, entitled "CATALYST FOR SPEED COOKING OVEN."

In addition, the present application is related to co-pending U.S. patent application Ser. No. 10/614,268, filed Jul. 7, 2003, entitled "MULTI RACK SPEED COOKING OVEN," which claims the benefit of U.S. Provisional Application No. 60/394,216, entitled "RAPID COOKING OVEN," filed Jul. 5, 2002; related to U.S. patent application Ser. No. 10/614,710, filed Jul. 7, 2003, entitled "SPEED COOKING OVEN WITH GAS FLOW CONTROL," which claims the benefit of U.S. Provisional Application No. 60/394,216, entitled "RAPID COOKING OVEN," filed Jul. 5, 2002; related to U.S. application Ser. No. 10/614,532, filed Jul. 7, 2003, entitled "SPEED COOKING OVEN," which claims the benefit of U.S. Provisional Application No. 60/394,216, entitled "RAPID COOKING OVEN," filed Jul. 5, 2002; and to related co-pending International Application No. PCT/US2005/007261, filed Mar. 7, 2005, entitled "CONVEYOR OVEN," which claims the benefit of U.S. Provisional Application No. 60/550,578, filed Mar. 5, 2004, entitled "SPEED COOKING CONVEYOR OVEN," the benefit of U.S. Provisional Application Ser. No. 60/551,268, filed Mar. 8, 2004, entitled "ANTENNA COVER," and the benefit of U.S. Provisional Application No. 60/615,888, filed Oct. 5, 2004, entitled "CATALYST FOR SPEED COOKING OVEN."

The present application contains technical disclosure in common with co-pending International Application No. PCT/US/2003/021225, entitled "SPEED COOKING OVEN," filed Jul. 5, 2003, which claims the benefit of U.S. Provisional Application No. 60/394,216, filed Jul. 5, 2002, entitled "RAPID COOKING OVEN;" and contains technical disclosure in common with International Application No. PCT/US/2004/035252, filed Oct. 21, 2004, entitled "SPEED COOKING OVEN WITH SLOTTED MICROWAVE ANTENNA," which claims the benefit of U.S. Provisional Application No. 60/513,110, filed Oct. 21, 2003, entitled "SLOTTED ANTENNA," which also claims the benefit of U.S. Provisional Application No. 60/513,111, filed Oct. 23, 2003, entitled "MICROWAVE ANTENNA COVER FOR RAPID COOKING OVEN," which also claims the benefit of U.S. Provisional Application No. 60/614,877, filed Sep. 30, 2004, entitled "SLOT ANTENNA."

Each of these applications are incorporated herein by reference as if fully set forth herein.

BACKGROUND

This invention pertains to the art of cooking appliances and, more particularly, to an oven for cooking a food product by air alone; or a combination of air and microwave energy. The invention has particular application to high speed cooking of food products at very high quality standards.

Restaurants and commercial cooking establishments have a need for faster cooked food in order to more efficiently run and maintain their commercial businesses. The ability to more rapidly cook food, and thereby more quickly serve food and move customers through a restaurant has great value during peak times when table space may limited due to high customer traffic. Therefore, speed cooking ovens are becoming more widely known and utilized by those skilled in the art of commercial cooking. There exist several types of commercial speed cooking ovens on the market today. These commercial cooking ovens utilize various techniques to accomplish speed cooking and have been and are referred to herein as "hybrid" ovens, and are generally defined as ovens that employ a combination of microwave energy and at least one other thermal source (convection, radiant energy, and/or steam) to increase cooking speed over a conventional oven, while at the same time maintaining a quality of cooking reasonably similar to a conventional cooking oven. As used herein the terms "hybrid" and "combination" have the same meaning unless otherwise specified and the terms "conventional cooking oven" "conventional cooking" and "conventional means", have the same meaning and refer to cooking at the quality level and at the speed that is currently widely utilized. By way of example, the "conventional cooking time" for a brand name of Grand Cinnamon rolls, according to the package, is approximately 28-30 minutes (e.g. conventional cooking time).

Just as speed cooking will become the standard for commercial cooking, speed cooking also has application in residential cooking, and will become the standard for residential use also. The ability to quickly cook food, and the ability to cook a variety of food products together without flavor or odor transfer from one food product to the next, within the same cooking operation, is desirable and of high interest to residential as well as commercial users.

There have been relatively few dramatic changes in the cooking art over the years, as man has moved from open flame cooking at the campfire to gas fired and electric resistance heating elements for cooking; and later the introduction of the microwave oven totally revolutionized the food industry as new food products were developed, new methods of food distribution developed and new and different opportunities opened up for residential and commercial establishments as re-thermalization of food products, very quickly, became possible. It is not necessary to recount the dynamic impact the introduction of the microwave has had on daily life, and also the many industries that were created because of the introduction of affordable microwave re-heating devices.

High quality speed cooking will become the next standard as people will want the ability to cook very quickly, but also will want a high quality food product. It is always therefore very important that speed cooking produces a finished food product that is at least as good as conventionally cooked food products, and in some cases as high as gourmet standards. For example, a frozen pizza can be cooked in just 3 minutes or less in a speed cooking oven as compared to the conventional cooking time of approximately 25-30 minutes in a conventional oven. Or, cinnamon rolls cooked from raw dough can be cooked in a speed cooking oven in 2-3 minutes instead of the conventional 28-30 minutes. Each food product can be cooked at these speeds and maintain the taste appearance and overall quality of a conventionally cooked food product. An important aspect of proper speed cooking is that the food product produced in a speed cook oven (in $1/7^{th}$ to $1/10^{th}$ the time in a conventional oven) is at or above the taste, appearance, quality and performance levels of the same food product cooked by conventional means. As this new and exciting technology is introduced into the market and becomes commercially and residentially available, the entire food industry will be re-energized and re-organized around new and different methods of food production, packaging, transportation, delivery, preparation and cooking of food products.

One reason the average family takes less time today to be together for meals is because the time required to prepare a complete meal, including the cooking time, is more time than most people are willing to invest. With quality speed cooking, cooking will become "just in time" or "on demand" as people will be able to cook foods 5 to 10 times faster than conventional cooking, and at quality levels equal to or higher than conventional cooking. The ability to custom cook, on demand, will revolutionize cooking, and food preparation. With this invention it is possible to short order cook exactly the food each person desires. Instead of "meatloaf tonight" it will be possible for one person to have steak, another chicken and another pork chops, because these food items can be cooked, from raw, together, in this speed cooking oven in a fraction of the time of conventional cooking. Or, for example picture an afternoon dinner party where fresh fish is laid out on a bed of ice. As guests approach the fresh fish selection, each can pick out a particular filet and watch as each filet is cooked perfectly in just a minute or two. Additionally, the person cooking the food will have the ability to control how well done the fish is cooked, the degree of browning on the outside (both top and bottom) and the inside temperature of the fish. If one person desires a salmon filet lightly done, this may take 1 minute while the next person may desire a well done filet which may, for example, only take an additional 20 seconds.

In addition to the speed advantage, this invention produces very high quality food products that are cooked perfectly—cooked the way the food product should be cooked instead of cooking using the conventional method. Historically, conventional cooking ovens heat to a predetermined temperature before the food product is inserted into the oven. Once the food product is inserted into the oven and over a period of time, the heat that has built up within the oven to a pre-heat temperature slowly conducts through the entire food product until there is overall heating of the interior of the food. This process is inefficient, but people have nevertheless developed the skill level necessary to overcome the inefficiencies of the method. With this invention food is cooked perfectly with less waste from boil off, cook off or other loss of food product due to the cooking process. As such, it will be possible to develop food products with fewer or less initial ingredients and still obtain the same final finished cooked food product. This invention therefore also relates to methods of food production wherein fewer ingredients are needed in order to attain the same final cooked product. Cooking with this new and novel method will allow food companies to reduce the quantity of the initial ingredients utilized for food preparation, but still maintain the final end product after the cooking process. Because this cooking process requires less initial starting ingredients (weight and volume) less packaging material is therefore required. Smaller package size leads to more space on the grocery shelves and in refrigeration coolers. Shipping costs, packaging costs, shelf space in grocery stores and many other areas of the food production system and delivery chain will be impacted as the world of food preparation, storage, transportation, delivery, preparation and sale moves from conventional cooking to speed cooking. In addition to the previously mentioned benefits, the ability to cook to gourmet standards with this invention will spawn an entire industry wherein gourmet signature chefs will be able to develop, brand and market their signature products for people to take home and enjoy without the cost or time expense of dining at a Five Star Restaurant. The speed cooking oven described herein will also be capable of internet connectivity. Information such as recipes, cook settings, special cooking instructions for gourmet food products can all be downloaded from the internet and imported directly into the cooking oven. Additionally, diagnostic tools will enable service providers to better predict future component breakdowns and also predict regular maintenance requirements, as remote monitoring of the oven will be possible.

Today there are a number of combination ovens sold for commercial use that cook in the range of two to three times faster than conventional. These ovens typically have an oven cavity roof or back wall launch of the microwave energy into the cooking cavity, with a simple convection flow of air that creates a gentle air flow pattern within the oven.

Fast cooking ovens in the 2 to 3 times speed range have also been developed.

Compared to the higher speed hot air impingement flow speed cooking ovens, the more traditional microwave convection oven is a relatively simple rapid cook oven capable of cooking speeds of up to 3 times faster than conventional. These ovens utilize a convection blower motor and blower wheel mounted on the back wall (or side wall) with the oven air being drawn directly into the inlet and discharged from the blower wheel perimeter. A baffle plate isolates the blower discharge from the inlet and creates an outward flow of air along the oven cavity side, roof and floor walls, with the air flow turning back over the food and returning to the blower inlet. The baffle plate looks like a false back wall with gaps around the edges for air discharge and an opening in the center for air return and microwave energy in these ovens has been introduced from top, bottom, or the side walls. In general, these designs have a number of limitations and drawbacks. The first limitation is that the microwave launch system cannot equally illuminate multiple racks or pans of food. As a result, the efficiency of the microwave energy must be purposely reduced in order to avoid hot spots and poor cooking quality. Second, in a top (roof) launch or bottom (floor) launch microwave system, the cooking pans or other cooking vessels containing the food are situated directly above (in a bottom launch system) or directly below (in a top launch system) the microwave launch system which obscures the microwave energy from the pans further away from the microwave illumination source. To compensate for the non-uniform illumination of the microwaves within the oven cavity, the design of the oven microwave system is purposely limited in order to achieve uniformity. As a result, most traditional microwave convection ovens are actually single rack position rapid cook ovens. Many of these top or bottom launch systems require either a mode stirrer (a mechanical device to stir the microwave "e field") or a turntable that rotates a platter or plate upon which the food rests (top launch system), or in some cases both a mode stirrer and a rotating tray is utilized. In addition to the microwave energy field non-uniformity, the convection air flow also has non-uniform behavior which results in lower air flow rates in the oven limiting the convection heat transfer rate, thereby limiting the cooking speed of the oven.

Generally, these oven designs direct the oven air flow down the side walls until the air flow reaches the oven cavity floor, then the air turns towards the back wall, flowing over the food product before returning back to the blower inlet and all the air returns to the blower inlet opening (usually located in the center of the back or side wall). The center pan often has a distinctive "V" cooking pattern near the blower inlet and this creates flow non-uniformity from the center rack position to the top/bottom positions. Balancing the air flow over several pans or cooking vessels is difficult as the air is drawn to the center of the back wall. As discussed herein, imparting high air flows to the oven in order to achieve high cook speeds results in non-uniform cooking. Usually, the discharge from a baffle plate is adjusted with air flow vanes or flow restrictions in order to achieve a more uniform flow state. The effectiveness of this approach is limited, and in general the oven air flow rates are maintained at modest rates.

In addition to the drawbacks described above relative to cooking speeds, these oven designs do not manage or handle air borne grease entrained by the convection air and by health code, these ovens must be operated under a hood when cooking meats or other grease laden foods. Information relevant to attempts to address these problems can be found in U.S. Pat. Nos. 4,337,384; 4,431,889; 5,166,487 and EP 0429822AJ. They have some speed advantage, but are not fast enough to radically change the cooking operation in a restaurant, commercial establishment or the home kitchen.

It has been found that, in order to create a break-through in the current cooking environment, cooking speeds greater than 5 times conventional cooking speeds must be achieved. A number of developments have taken place to create high speed commercial cooking ovens in the 3-10 times faster than conventional range, but fundamental drawbacks exist in these high speed commercial ovens and approaches. These ovens cook at high speed but some do not provide a quality finished food product. These ovens tend to be complex, unreliable and expensive to manufacture. As such, the finished sales price is high, thereby limiting the demand for, and commercial success of the ovens. Due to the state of the art of these high speed commercial cooking machines, the oven cavities tend to be small, they create smoke and odor, and therefore require expensive ventilation or catalytic clean-up. They are generally difficult to maintain, generally employ the use of a complex user interface with multiple control variables, and generally require large power supplies. They also tend to be less reliable due to the use of specialized components.

There have been different approaches to high speed cooking utilized in the past. One is impingement style air flow coupled with microwave, and another is convection style gas flow with microwave. Several high speed cooking ovens featuring impingement style convection flow fields coupled with microwave energy have been developed and impingement style heat transfer is not new in the art. As an example, impingement style heat transfer has been described in the General Electric Heat Transfer Data Book 1981 as "One method of producing relatively large forced convection heat transfer coefficients on a surface by gas (or other gases) is the use of a multiplicity of jets impinging upon the surface. As the gas jet approaches close to the surface it turns by an angle of 90 degrees, and thereby becomes what is called a "wall jet" FIG. 1 (after the 90 degree turn). This type of impinging heat transfer has been studied extensively with predictive heat transfer relationships and the use of this impingement style cooking has historically been employed.

Some of the current oven designs feature opposed primary energy flows with impingement convection heat transfer being directed onto the upper surface of the food product (straight down at 90 degrees to the food product) and microwave energy launched from the floor of the oven cavity into the bottom of the food product. To provide bottom side convection heat transfer, the impingement air flow is pulled around the sides of the food product and across the bottom of the food via a low pressure gas return duct located directly below the food and has been described as a "shroud effect". The flow beneath the food is accomplished using a ceramic platter with stand offs that have the dual purpose of supporting the food product and directing air flow along the bottom side of the food (as the standoffs are used to elevate the food thereby creating the air flow passage ways) with the air flow exiting downward via a series of apertures in the ceramic platter. The microwave energy is launched from below the food product and enters the food after passing through the ceramic platter, such ceramic platter is microwave transparent to allow the passage of the microwave energy through the platter and into the food product. While this approach produces high cooking speeds (5-10 times faster than conventional oven) it has several limitations as the ovens have non-uniform energy fluxes (convection and microwave) between the top and bottom of the food product thereby requiring complex control of the microwave and convection heating systems (sub-systems) to achieve speed cooking. In general, both the microwave energy and the convection energy flows are adjusted several times during the cooking cycle. The devices used to accomplish this adjustment are intensive blower motors and blower motor speed controllers, microwave power modulation, and a complex oven controller/user interface (needed to input multiple power and time settings for a given recipe). These devices are expensive and dramatically add to the complexity and cost of the final product. Additionally, these sub-systems tend to be unreliable, causing high service callouts. To achieve high speed the ovens require a relatively complex and expensive variable speed convection blower motor speed control with dynamically braking blower motor speed controllers and sophisticated electronic oven controls. The air blower must have variable speed capability in order to provide lower convective heat transfer rates when cooking more delicate food products such as cakes and other pastries. These ovens also have a lack of independent top side and bottom side convection (browning) heating because top impingement flow must wrap around the food product and flow under the food product in order to accomplish bottom side heating/browning. This requires the use of the previously mentioned expensive, fragile, and difficult to clean microwave transparent ceramic platter, which allows for the passage of microwaves. The ceramic platter must be configured with air flow channels in order to accomplish bottom side browning. The ceramic platter is expensive to manufacture, chips easily (creating health, performance and reliability problems) and requires regular cleaning, maintenance, and replacement. Because the ceramic platter is a necessary component, if a spare is not kept on hand, the oven is rendered inoperable in the event a platter is broken. Supply chains, stocks of inventory and additional money must be set aside in order to assure a constant supply of these ceramic platters. Indeed, ovens utilizing these ceramic platters have met with difficulty when introduced into commercial establishments with the prospective owners of these ovens constantly battling reliability problems and the need to re-supply their commercial establishments with ceramic platters. As an example of one problem, a chipped ceramic platter absorbs moisture, grease, oils and other by-products of the cooking process. As water, for example is absorbed within these platters, microwave performance decreases because the microwave energy interacts or couples with the water molecules (the principle of a microwave oven is the excitation of the oxygen-hydrogen bond within the water molecule) thereby reducing the microwave energy available for cooking. At some point, the overall oven heat will eventually, at least somewhat, dry a water soaked ceramic platter by boiling off the trapped water within the platter, but until this occurs, varying degrees of cooking performance may be experienced due to the varying moisture content within the platter. As more water is evaporated from the platter, more microwave energy is then available to couple with the food product instead of the water trapped within the platter. A food product cooked upon a water soaked platter will take longer to cook (or at least that portion of the cooking attributable to microwave energy) than the same food product cooked upon a dry platter. For this reason, a speed cooking oven requiring the use of a ceramic platter with apertures to both direct air flow and exhaust air flow is undesirable, but is nevertheless necessary as the described oven utilizes the "shroud" or "wrap" effect in order to fully and somewhat properly cook the food product; and the shroud effect is only created by the wrapping of the air around the food product via use of the ceramic platter. Also, with the requirement of very rapid air circulation through the oven (high velocity impingement), these ovens tend to be noisy. Cycling of these ovens from low velocity to high velocity generally produces a whirring noise not dissimilar to the sound of a jet engine winding up.

In these ovens, a uniform vertical jet flow field, over a range of flow rates, is needed for cooking over the entire cooking rack area. A common result of this requirement is that there is a lack of uniformity; so it is necessary to restrict or reduce the cooking zone to that area that experiences appropriate cooking, relative to the platter. This reduces the cooking capacity for a given oven cavity size because less of the platter can be cooked upon.

Especially lacking in these ovens is the ability to cook in the corner sections of the oven. With other technologies, means to overcome this problem are complex and have at least partially been solved by rotation of the food product under air jets with the use of a turntable. Using rotation (turntable) to compensate for jet non-uniformity also has the effect of reducing the useful cooking area of the appliance by at least approximately 25%. The circular turntable within either a square or rectangular oven cavity bottom does not take advantage of the cooking area located within the corners of the oven. In addition to the previously mentioned drawbacks of the ceramic platter, the platter further complicates the ability to achieve uniform flow conditions because the vertical jet air flow pattern couples to the ceramic platter which is being used to channel flow under the food. Additionally, the non-uniformity is a function of the shape and size of any cooking vessel used (e.g. pan, cookie sheet) because the air flow must wrap around the cooking vessel. In addition to the problems associated with these other oven cavity bottoms, the design and construction of the oven cavity top is complex given the need to add or modify the oven cavity roof for impingement nozzle plates/supply ducts. Also, modification of the oven cavity bottom is required for microwave launching, modification of the bottom and/or back wall is required for return gas ducts, and modification of the oven cavity top is required for the impingement style gas nozzles. Taken together, these modifications result in a small cook chamber section volume as compared to the entire oven cavity volume.

Another disadvantage in the previously described oven is that it is difficult to provide a microwave seal to the cavity floor (microwave launches through the oven floor through a circular waveguide) to prevent grease/liquid contamination of the wave guides. This is important because grease, water vapor or other particulate contamination of the microwave waveguide causes premature failure of the magnetron (tube) used to generate the microwave energy or "e-field" within the oven cavity. In these ovens, an opening in the oven cavity floor bottom allows the microwave launcher to extend up and through the oven cavity floor but the launcher must be sealed with a material that allows the passage of microwave energy, without any leakage of the seal because leakage of the seal then allows grease, food products and other by-products of the cooking process to contaminate the microwave launching system, thereby reducing the life of the microwave system, causing again, as described above, tube failure and service callouts.

Another disadvantage of the high speed ovens described above is that they require grease control because of the high velocity of the impinging air jets. This high velocity air impingement flow tends to entrain grease, both particles and vapor, into the convection gas, which quickly soils the oven cavity surfaces. One method of dealing with this grease load has been the use of a large catalyst to control the airborne grease. Drawbacks of the catalyst include its high cost and the catalyst tends to cause a pressure drop in the impingement air flow, thereby reducing operating efficiencies. The pressure drop is compensated by the use of a larger blower, thereby increasing component cost and lowering operating efficiencies and raising energy costs. The catalysts must be replaced periodically, adding both a service cost and an equipment cost to the oven.

Other technologies use a different impingement approach where vertical air jets are generated from the oven roof and floor simultaneously. The oven cavity bottom or floor impingement jets provide for bottom side cooking/browning while the oven cavity roof jets provide top side cooking and browning. In this device, the microwaves are launched from above the food product. Like the high velocity gas impingement air flow technology described above, this approach has several drawbacks.

First, the floor located gas nozzle plate and its supply duct are very difficult to maintain given their susceptibility to food spoils, spills and grease accumulation. To utilize the entire (or nearly) cooking area (rack), the top and bottom air jets must be very uniform in velocity or a non-uniform cooking and browning of the food product will result where the impingement jets produce circular brown spots on the food product surface. This polka dot browning effect is, of course generally not acceptable. Additionally, the requirement for very uniform gas flow to the food product adds complexity to the air flow system.

Second, uniform air jet fields are difficult to achieve at flows other than the design flow rates. When lower air flow rates (velocities) are needed, such as with pastries, it is difficult to attain proper air flow rates less than the design flow rate specified for higher air flows. Such reduced flows will minimize the effective cooking area within the oven cavity to a portion of the cavity where a reasonable flow field exits in order to cook a food product to an acceptable quality level. Alternatively, to compensate for the requirement of a less aggressive air flow, the convection flows must be greatly reduced, which will result in longer cook times (defeating the desire for a speed cooking oven).

Third, the general oven construction is complex, as the supply duct to the roof air plate must also act as a launch box for the microwaves. This requires that the roof jet plate be transparent to microwaves (e.g., ceramic plate with jet holes) so that the microwaves can be launched through the plate. Additionally, the floor ducts may become complex parts in the event they are designed to be removed for cleaning and/or servicing.

Fourth, having supply ducts on the floor and roof of the oven cavity greatly reduces the useful volume (cook section) of the oven because as much as half of the height of the oven cavity is occupied by these air channels. Other techniques have been used in an attempt to overcome these issues, but these techniques generally require more complexity such as oscillating nozzles, rotating food support, special food containers, and a smaller cook section and the work arounds tend to add complexity, cost and create other undesirable issues.

Finally, the previous approaches described for speed cooking ovens are suited for single rack cooking or single level cooking. Impingement style air flow is ineffective with two or more rack positions because one rack with food product will block air flow to the second or third rack.

During normal conventional cooking, metal pans, metal pots and metal sheet pans (and other metal products) are generally used, both commercially and residentially and the use of metal pans is widespread. It will be difficult for speed cooking ovens to become popular within either the commercial foodservice marketplace or within the residential market unless quality speed cooking utilizing metal pans can be accomplished.

Generally, speed cooking is slowed by the use of metal pans as microwave energy cannot penetrate and is deflected (re-distributed) within the oven cavity by the pans. Additionally, the metal pans completely block microwave energy when the energy is directed from below the pan on a single rack oven or in a top launch oven, the microwave energy is blocked from the lower pan by the top pan. It is therefore desirable that a speed cooking oven is capable of speed cooking, at high quality levels utilizing metal pans.

Another problem generally encountered is that browning of the lower surface of the food product is difficult to control because the method generally utilized for bottom side browning is conduction through a metal pan (pan is heated by radiant or microwave energy and then the thermal is transferred to the food product by direct contact with the food product) and this heating produces a griddle effect, thereby browning the bottom side of the food product. This method is difficult to control and generally produces an over brown or burned bottom surface of the food product. The ability to properly brown the bottom side of a food product, within a metal pan, is therefore important.

Accordingly, it is an object of the present invention to provide a method and apparatus for speed-cooking within a single-rack oven with an improved gas flow design capable of cooking most food products 5 to 10 times faster than conventional cooking.

It is another object of the present invention to provide such a speed cooking oven which utilizes a gas flow pattern that averages out the maximum and the minimum gas flow variation for a given point in the oven cook section resulting in a gas flow that is averaged spatially over the food product surface.

It is also an object to provide such a speed-cooking oven that produces uniform low flow conditions required for high quality baking.

A further object is to provide such a speed-cooking oven with a continuous floor that is not interrupted by gas ducts or microwave launching and/or other systems and is easy for the user to clean and maintain.

Another object is to provide a means to produce and direct various gas flow patterns in the oven that either reduce or enhance the convection heat transfer coefficient to the product.

It is another object to provide a relatively constant flow through the oven which eliminates the need for varying the air flow thereby improving grease extraction by maintaining higher flow rates through-out the cooking cycle regardless of the required heat transfer to the product.

Another object is to provide such an oven with a simplified oven construction, eliminating the need for variable speed impingement air blowers, dynamically braking blower motor speed controllers and associated electronics.

Still another object is to provide a speed cooking oven that is capable of high quality speed cooking within metal pans, pots, sheet pans and other metal cooking devices found in residential and commercial kitchens.

Another object is to provide a speed cooking oven that is capable of performing bottom side browning of the food product utilizing gas flow to the bottom surface of the food product without the use of floor mounted air plates.

Another object is to provide such a speed-cooking oven that increases the useful oven cook section height by eliminating ducts and/or jet plates from the floor of the oven.

Another object is to provide such an oven with a gas flow field where grease entrainment is reduced by eliminating the vertical impingement style flow that tends to throw or kick grease into the gas stream from both the cooking pan and the food product, while achieving sufficiently high heat transfer rates.

Another object is to provide such an oven that matches the general microwave and convection heat transfer energy patterns, such that uniform cooking conditions can be achieved on the top side and bottom side of the food product.

Another object is to provide such an oven with gas deflection means that allows flexibility of gas diversion throughout the speed cooking oven.

It is a further object to provide such an oven for speed cooking on multiple racks.

It is a further object to provide such an oven which is more cost effective to manufacture and easier to clean and maintain.

Yet another object is to provide such an oven which is more reliable due to improvements and simplifications in component sub-systems.

Other objectives, features and advantages will be apparent in the written description which follows.

SUMMARY

It has now been found that the above objects are obtained in a speed cooking oven provided with a unique combination of high gas flow rates that are averaged at the food product surface, and a means for changing the convection heat transfer rate to the food product by controlling the oven gas flow patterns. Additionally, side wall mounted microwave systems may be utilized. As used herein, the term "gas" includes, but is not limited to air, nitrogen and other fluid mixtures that may be utilized within the cooking art. The exemplary embodiment of the speed cook oven has a simple construction featuring two small fixed blowers used to re-circulate hot gas within the oven cavity. Convection gas is supplied to the oven cook cavity by slotted or perforated cavity air distribution plates that direct gas flow to the top, sides, and bottom of the food product. The gas flow angle to the product is greater than approximately zero degrees from horizontal (cavity floor as horizontal reference) and less than ninety degrees from the horizontal floor surface. Gas flows from the top left side of the oven conflict and collide with gas flows from the top right of the oven upon the surface of the food product. This turbulent mixing of the left and right gas flows at the surface of the food product produces a spatially averaged gas flow that effects rapid cooking of a food product. While top gas flows glance off of each other, conflicting, colliding and mixing upon the top surface of the food product, gas flow is directed towards the bottom of the food product from the lower left and lower right portions of the oven cavity. This gas also mixes at the bottom surface of the food product, conflicting and colliding thereby causing a spatial averaging of the gas flow at the food product surface, effecting rapid cooking of the food product. As used herein, the term "rapid cooking" and "speed cooking" have the same meaning and refer to cooking at $\frac{1}{5}^{th}$ to $\frac{1}{10}^{th}$ the time of conventional cooking. Once the gas has circulated around the food product, it is drawn to the roof (top) of the oven cavity for convection heating, grease control, odor control and eventual movement to the inlet side of the convection blowers and return to the oven cavity. The oven therefore utilizes a closed system wherein the spent air is re-circulated through the oven many times during a cooking operation.

A first conventional microwave waveguide with slotted antenna is positioned along the left side wall, and a second conventional microwave waveguide with slotted antenna is positioned along the right side wall of the oven cavity. The microwave feeds (antenna) are centered near the cooking rack level (below the upper gas supply duct), such that nearly equal amounts of electromagnetic energy is directed towards the top and bottom surfaces of the food product. Standard 2.45 GHz microwave producing magnetrons (tubes) are used, producing a maximum power level for the oven of approximately 2000 watts (delivered to the food) or approximately 1000 watts per microwave magnetron.

After the gas passes over the food product and through the cavity, it flows up to the oven roof where it exits the oven cavity. As the gas flow exits the oven cook cavity it passes over a thermal device (either an electric resistance, infrared, or natural gas fired convection gas heater, or other means of heating which may be direct or indirect heating). When electric heating elements are used, the preference is a sheath type heater configured into a compact coil shape. Depending upon the oven size and desired speed of cook (i.e., gas flow rate through the oven) the heater will deliver approximately 2500-4000 watts of energy to the gas. The thermal delivery to the gas flow is variable depending upon the particular characteristics of the particular speed cooking oven application and the exemplary oven described operates at from approximately 2500-4000 watts. The oven cavity roof mount gas heater location is ideal for a gas fired gas heater relative to ease of installation, serviceability, and the ability to incinerate grease particles that come in contact with the very hot product of combustion. Of course, the hot products of combustion are mixed with the oven gas returning to the blower. A number of gas combustor types are suitable for this application including a surface type burner and a typically burner input rate would, for example, be in the 14,000 Btu/hr range, but a larger or smaller burner may be utilized.

To prevent excessive grease build-up in the oven, a means to remove grease for the convection gas is incorporated into the oven. Immediately after the air passes over the gas or electric heater, but before the gas enters the blower inlet, it passes through a grease control device. This device mechanically separates the grease particles greater than 3.0 microns from the gas flow. The roof location makes it ease to install and service such a device.

The gas flow is directed from the blowers and into ducts that deliver gas from the left and the right sides of the oven cavity. The gas flow enters the oven cavity from the left side and from the right side and is directed over the top and bottom surfaces of the food product in a manner wherein the gas flow from the left side conflicts, collides and turbulently mixes with the gas flow from the right side of the oven at the top surface and at the bottom surface of the food product. This turbulent mixing of the gas flow patterns at the food product surface produces high heat transfer, thereby producing rapid browning and rapid cooking of the food product.

Additional objects, features and advantages of the present invention will become readily apparent from the following detailed description of the exemplary embodiment thereof, when taken in conjunction with the drawings wherein like reference numerals refer to corresponding parts in the several views.

BRIEF DESCRIPTION OF THE SEVERAL VIEWS OF THE DRAWING

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 16 is a front view of multi rack oven

DETAILED DESCRIPTION OF THE EXEMPLARY EMBODIMENT

The speed cook oven of the exemplary embodiment is shown as a stand alone commercial cooking appliance, but it is obvious to those skilled in the cooking art that this stand alone speed cooking appliance may exist in many other commercial and residential embodiments (e.g. counter-top oven, wall-oven, single rack oven, multi-rack oven) because the speed cook oven is scalable up or scalable down. As used herein, the term scalable has the meaning that additional larger or smaller embodiments can be developed for commercial and residential applications. Of course each embodiment or version may have different size characteristics, and require different voltages of electricity—as commercial power supplies are generally different than residential power supplies. This speed cook oven is therefore not limited to commercial uses only, and is equally applicable for residential (home) use. With initial reference to FIGS. 2-6, a speed cook appliance 1 is schematically shown in the form of a stand alone commercial counter top cooking appliance. As used herein, the term "commercial" includes, but is not limited to, the commercial food service industry, restaurants, fast food establishments, speed service restaurants, convenience stores (to list a few) and other mass feeding establishments and the term "residential" refers, generally speaking, to residential applications (home use), although the term is not limited to residences only, but refers to non-commercial applications for the speed cooking oven.

Figure 2:
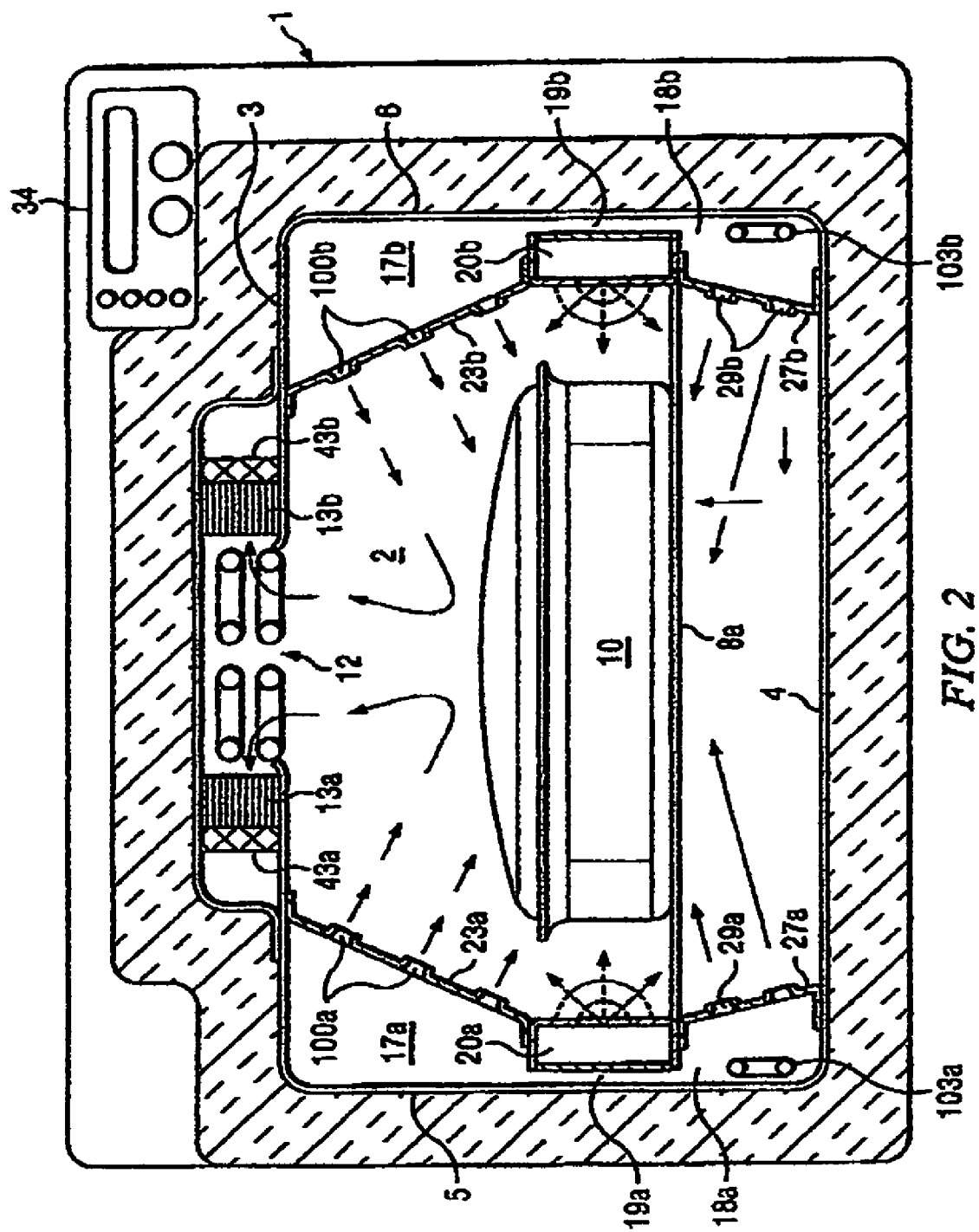
FIG. 2 is a front elevation of a single rack oven according to the present invention
Figure 3:
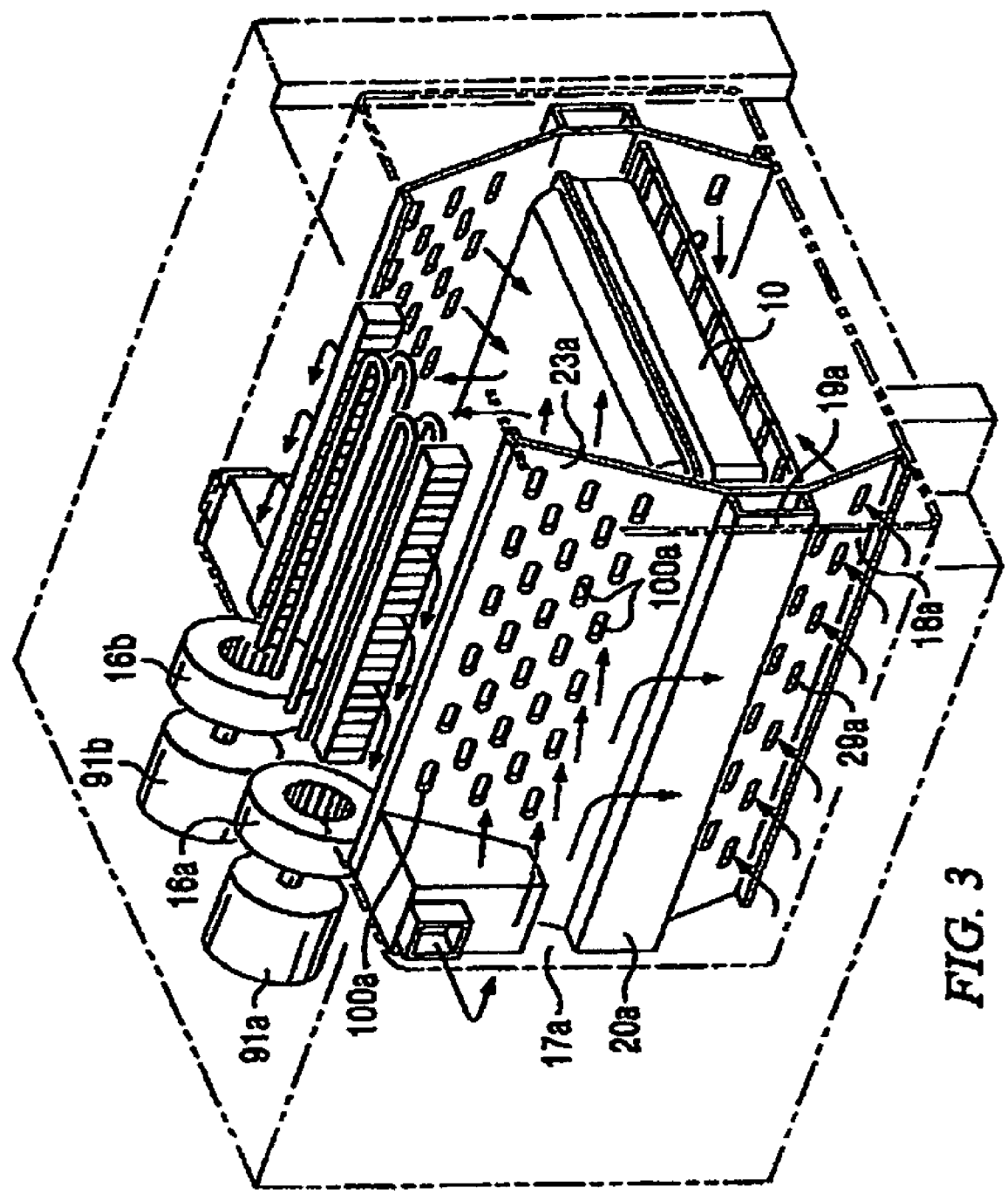
FIG. 3 is an isometric view of the left side and left front of oven
Figure 4:
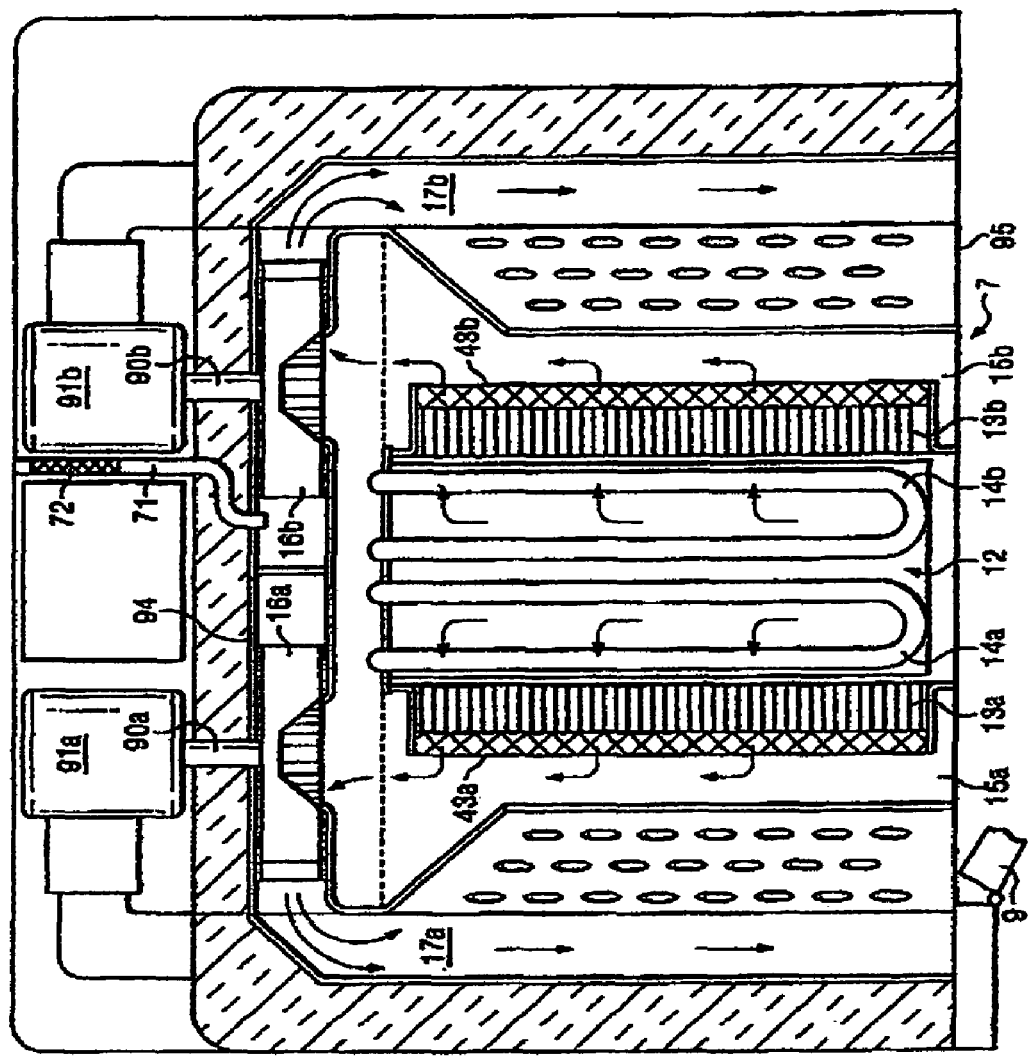
FIG. 4 is a top view of oven

Appliance 1 includes an oven cavity 2 generally defined by, FIG. 2, a top wall 3, a bottom wall 4, left side wall 5 a right side wall 6, and FIG. 4, a back wall 94 and a front wall 95. Oven cavity 2 also has associated therewith an access opening 7, FIG. 4, through which food items 10 may be placed within oven cavity 2 upon cooking rack 8a, FIG. 2. Although the exemplary embodiment is shown as a countertop oven with one rack 8a, supported by side walls 5 and 6, it is obvious to one skilled in the art that the oven may be made with multiple racks and multiple gas delivery systems, and is not limited to a single rack design. As used herein, the term "gas" refers to any fluid mixture, including air and nitrogen that may be used in cooking processes and applicant intends to encompass within the language any structure presently existing or developed in the future that performs the same function. Although the cooking rack 8a is shown as supported by side walls 5 and 6, it is obvious to one skilled in the cooking art that rack 8a may be a free-standing cooking rack not supported by the side walls. Cooking appliance 1 has a hinged door 9, FIG. 4, pivotally attached to the oven front for closing the cooking section opening 7 during cooking operation. Hinged door 9 may be swung between an open position wherein the door allows access to oven cavity 2 and a closed position wherein the door covers the opening into oven cavity 2. Although illustrated as a hinged door pivotally attached at the left side of the front of the oven, the door may be hinged on the right side, bottom side or top side.

The speed cooking oven is comprised of two independent gas transfer systems, described herein as a left gas transfer system and a right gas transfer system, wherein left gas transfer system delivers gas to and from the left side of the oven cavity 2, and right gas transfer system delivers gas to and from the right side of the oven cavity 2. Oven cavity 2 also has associated therewith vent tube 71, FIG. 4, which allows for the passage of vent gas from oven cavity 2 to atmosphere. Affixed within vent tube 71 is odor filter 72 which provides for the removal of odors caused by the cooking process. Odor filter 72 may be made to be removable for cleaning or replacement. Various materials may be utilized to accomplish odor removal and varying efficiencies of said materials may also be employed. For example, in some instances it may be desirable for the odor filter to completely (as much as is possible) filter all odors while at other times it may be desirable to provide for a less efficient odor filter 72 in order to allow for the passage of some cooking odors. It has been found that during the cooking process, for example baking bread, the operator has an expectation of smelling bread cooking and it may not be desirable to completely filter all odors.

Referring to FIG. 4, gas is transferred to and from oven cavity 2 via a left gas transfer system, which is comprised of a left gas transfer section 15a, which extends from the front to back of oven top wall 3, along the left side of top wall 3. In fluid connection with left gas transfer section 15a is top gas egress opening 12, which is open to, and in fluid connection with oven cavity 2 through top wall 3. Top gas egress opening 12 is substantially rectangular, although other geometries may be employed, and is centrally located within oven top wall 3 and provides for the passage of gas from oven cavity 2 into left gas transfer section 15a, as gases are removed from oven cavity 2 through top egress gas egress opening 12. Located within left gas transfer section 15a is left grease extractor 13a. As gas is drawn through top gas egress opening 12, the gas passes across left heating means 14a, prior to entry in and through left grease extractor 13a. Heating means 14a may include direct fired thermal energy, indirect fired thermal energy, propane, natural gas, electric resistance heating elements, and other thermal means; and applicant intends to encompass within the language any structure presently existing or developed in the future that performs the same function. After the gas is drawn across heating means 14a and through left grease extractor 13a, it is then drawn through left odor filter 40a and into left gas transfer section 15a. Alternate locations for left odor filter 40a can be utilized within the gas flow path and the location of the left odor filter adjacent to left grease extractor 13a is not required. In fluid connection with, and located within left gas transfer section 15a is a left gas accelerator, illustrated as left blower wheel 16a. Other devices may be utilized to accelerate the gas flow, such as a compressor, and applicant intends to encompass within the language any structure presently existing or developed in the future that performs the same function as 16a, 90a, 91a and 16b, 90b and 91b, to be discussed further herein. Connected to left blower wheel 16a is blower motor shaft 90a, which is direct drive with electric motor 91a. Other means may be employed for coupling blower wheel 16a to electric motor 91a, such as belt drive and the means is not limited to direct drive. Blower wheel 16a takes gas from oven cavity 2 and delivers the gas via gas transfer section 17a to the left top side of oven cavity 2. Top left gas transfer section 17a, FIG. 2, is in fluid connection with a lower left gas transfer section 18a via a left vertical gas transfer section 19a. Left vertical gas transfer section 19a is bounded by left side wall 5 and a left microwave waveguide section 20a. As can be seen in FIG. 2, as gas is pumped into top left gas transfer section 17a, the gas is discharged through a top left discharge plate 23a into oven cavity 2 via apertures 100a and onto the left top and side portion of food product 10. Apertures 100a may be slotted, regularly formed or irregularly formed apertures and are illustrated herein as nozzles 100a and 29a and applicant intends to encompass within the language any structure presently existing or developed in the future that performs the same function as 100a, 29a and 100b and 29b, discussed further herein. Gas that has not been discharged through top left gas discharge plate 23a flows to lower left gas transfer section 18a via vertical transfer section 19a. Gas that is distributed to lower left gas transfer section 18a may be re-heated, if desired, by a lower left heating means 103a, shown in FIG. 2, before said gas passes through slotted or perforated lower left gas discharge plate 27a via apertures 29a, for discharge onto the left bottom and left side portions of food product 10 in oven cavity 2. Lower left heating means 103a may be present in some embodiments and not present in others depending upon the particular requirements for the speed cook oven. Apertures 100a and 29a are sized for a low pressure drop, while providing and maintaining sufficient gas velocities in the range of approximately 2000 ft/minute to approximately 6000 ft/minute to properly cook the food product as described herein. In some instances, velocities below 2000 ft/minute and above 6000 ft/minute may also be utilized. As shown in FIG. 6, apertures 100a are sized such that the majority of the gas is supplied from the top left gas discharge plate 23a. The resulting imbalance of gas flows between the top left gas discharge plate 23a and lower left gas discharge plate 27a is desirable because the top flows must aggressively remove moisture produced and escaping from the top and top side surface of the food product 10. The imbalance also serves to heat, brown and/or heat and brown the food product 10.

Referring again FIG. 4, gas is also transferred to and from oven cavity 2 via a right gas transfer system, which is comprised of a right gas transfer section 15b, which extends from the front to back of oven top wall 3, along the right side of top wall 3. In fluid connection with right gas transfer section 15b is top gas egress opening 12, which is open to, and in fluid connection with oven cavity 2 through top wall 3. Top gas egress opening 12 is substantially rectangular, although other geometries may be employed, and is centrally located within oven top wall 3 and provides for the passage of gas from oven cavity 2 into right gas transfer section 15b, as gases are removed from oven cavity 2 through top egress gas egress opening 12. Located within right gas transfer section 15b is right grease extractor 13b. As gas is drawn through top gas egress opening 12, the gas passes across heating means 14b, prior to entry in and through right grease extractor 13b. After the gas is drawn across heating means 14b and through right grease extractor 13b, it is then drawn through right odor filter 40b and into right gas transfer section 15b. Alternate locations for right odor filters 40a, 40b can be utilized within the gas flow path and the location of the right odor filter adjacent to right grease extractor 13b is not required. In fluid connection with, and located within right gas transfer section 15b is a right gas accelerator, illustrated as right blower wheel 16b. Connected to right blower wheel 16b is blower motor shaft 90b, which is direct drive with electric motor 91b. Other means may be employed for coupling blower wheel 16b to electric motor 91b, such as belt drive and the means is not limited to direct drive. Blower wheel 16b takes gas from oven cavity 2 and delivers the gas via gas transfer section 17b to the right top side of oven cavity 2. Although illustrated as a conventional blower motor, blower motor shaft and blower wheel, other gas pumping means such as a compressor may be utilized to re-circulate gas to and from oven cavity 2 and the invention is not limited to use of a blower motor and blower wheel combination. Top right gas transfer section 17b is in fluid connection with a lower right gas transfer section 18b via a right vertical gas transfer section 19b. Right vertical transfer section 19b is bounded by right side wall 6 and a right microwave waveguide section 20b. As can be seen in FIG. 2, as gas is pumped into top right gas transfer section 17b, the gas is discharged through a top right discharge plate 23b into oven cavity 2 via apertures 100b and onto the right top and side portion of food product 10. Apertures 100b may be slotted, regularly formed or irregularly formed apertures and are illustrated herein as nozzles 100b and 29b. Gas that has not been discharged through top right gas discharge plate 23b flows to lower right gas transfer section 18b via vertical transfer section 19b. Gas that is distributed to lower right gas transfer section 18b may be re-heated, if desired, by a lower right heating means 103b, shown in FIG. 2, before said gas passes through slotted or perforated lower right gas discharge plate 27b via apertures 29b, for discharge onto the right bottom and right side portions of food product 10 in oven cavity 2. Lower right heating means 103b may be present in some embodiments and not present in others depending upon the particular requirements for the speed cook oven. Apertures 100b and 29b are sized for a low pressure drop, while providing and maintaining sufficient gas velocities in the range of approximately 2000 ft/minute to approximately 6000 ft/minute but as discussed with the left side gas delivery system, velocities below 2000 ft/minute and above 6000 ft/minute may be utilized if desired to properly cook the food product as described herein. As shown in FIG. 6, apertures 100b are sized such that the majority of the gas is supplied from the top right gas discharge plate 23b. The resulting imbalance of gas flows between the top right gas discharge plate 23b and lower right gas discharge plate 27b is desirable because the top flows must aggressively remove moisture produced and escaping from the top and top side surface of the food product 10. The imbalance also serves to heat, brown and/or heat and brown the food product 10.

The left and right gas supply systems, although independently described herein, are the same configuration and function to uniformly circulate hot gas flow across the top and top sides and bottom and bottom sides of the food product, and return the gas to the heating mechanism for re-delivery to the cooking cavity.

As described, the gas flow is delivered via four gas transfer sections 17a, 17b, 18a, 18b which are located in the top and bottom corners of oven cavity 2 as shown in FIG. 2. Gas flow transfer sections 17a, 17b, 18a and 18b extend from the back wall 94 of oven cavity 2 to the front wall 95 of oven cavity 2, although it is not required that the gas flow transfer sections extend the entire depth (front to back) of the oven cavity. Gas transfer section 17a is located in the top left corner of oven cavity 2 where top wall 3 intersects oven cavity side wall 5; gas transfer section 17b in the top right corner where top wall 3 intersects right side wall 6; gas transfer section 18a in the lower left corner of the oven cavity where bottom wall 4 intersects left side wall 5; and gas transfer section 18b in the lower right corner where bottom wall 4 intersects right side wall 6. Each of the gas transfer sections are sized and configured to deliver the appropriate gas flow for the particular oven utilized. For example, in a smaller oven, the gas delivery sections, indeed the entire oven, may be sized smaller in proportion to the smaller footprint of the particular requirements, and a larger oven will have proportionally larger gas delivery sections. As seen in FIG. 6, the left side and the right side gas flows converge on the food product 10 thereby creating an aggressive flow field on the food product surface that strips away the moisture boundary layer. This turbulently mixed gas flow directed at the food product can best be described as glancing, conflicting and colliding gas flow patterns that spatially average the gas flow over the surface area of the food product producing high heat transfer and moisture removal at the food surface, thereby optimizing speed cooking. The gas flow is directed towards the top, the bottom and the sides of the food product from the left and right sides of the oven cavity and the left and right side gas flows conflict, collide and glance off each other at the food product surface before exiting the oven cavity through top gas egress opening. As used herein the term "mixing" refers to the glancing, conflicting and colliding gas flow patterns that meet at and upon the top surface, the bottom surface and the left and right side surfaces of the food product and produce high heat transfer and speed cooking of the food product due to spatial averaging of the gas flow heat transfer. As used herein, the terms "mix", "mixing", "turbulent mix" and "turbulent mixing".

Figure 6A:
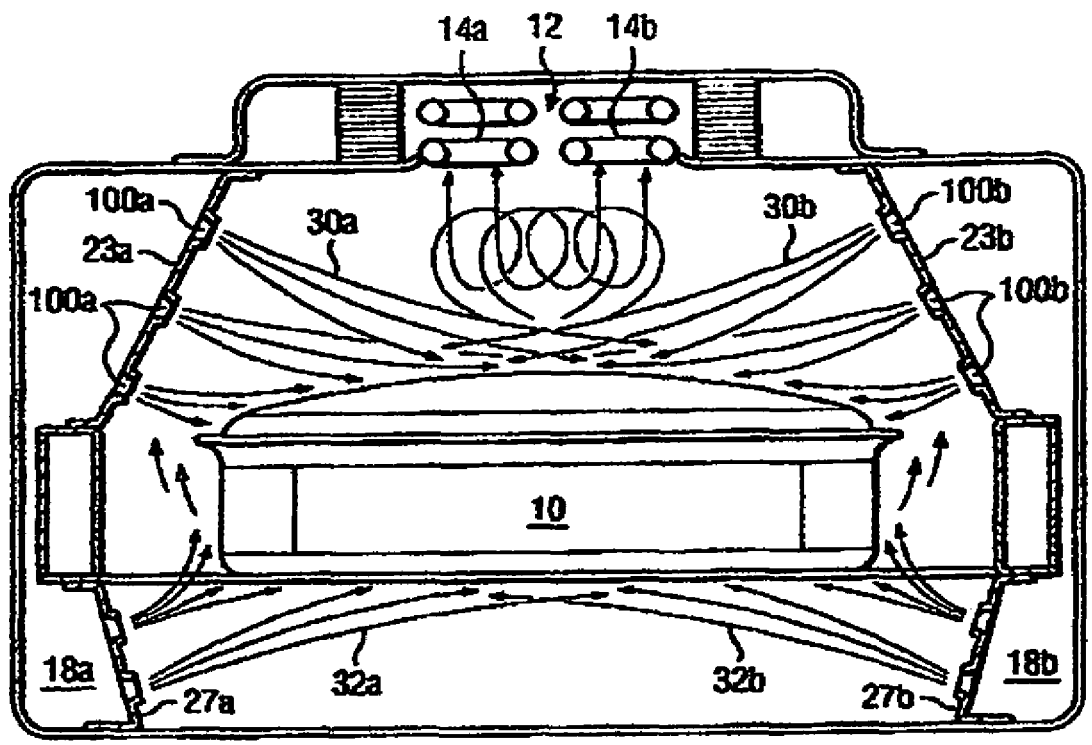
FIG. 6a is a front view of aggressive gas flow
Figure 6B:
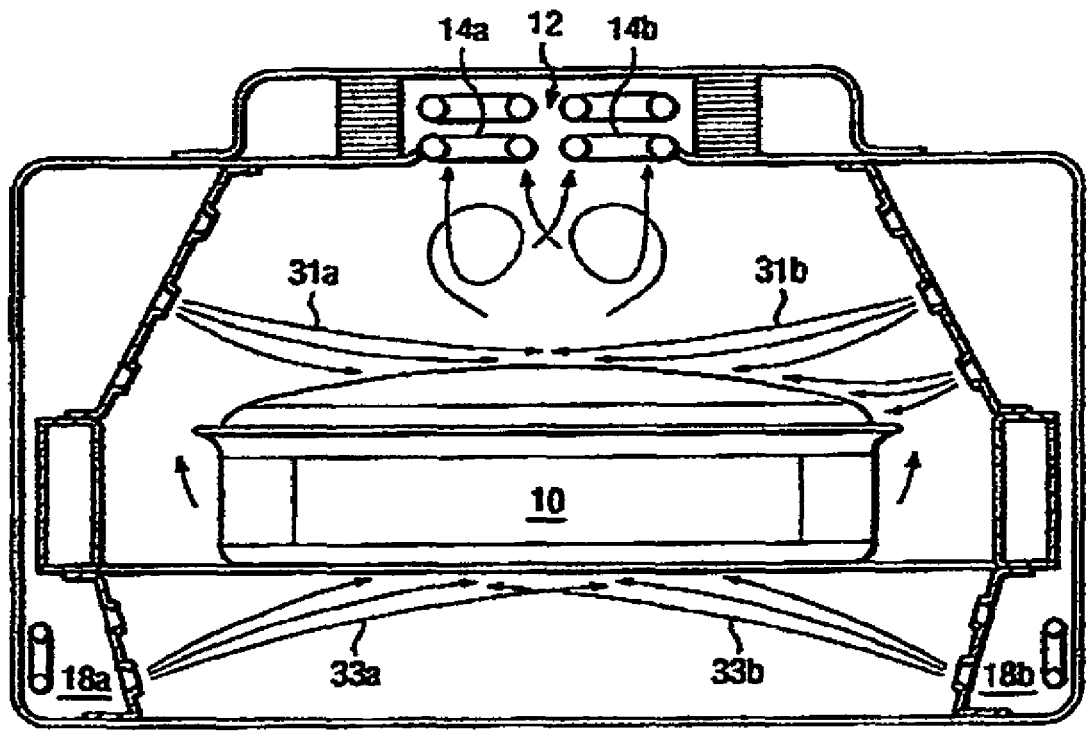
FIG. 6b is a front view of less aggressive gas flow

The oven of the present invention does not require smooth gas flow, laminar gas flow or air wrap gas flow. The mixing gas flows patterns are created within the oven cavity and, when appropriately directed and deflected, produce a high quality cooked food product very quickly. Enhancing the highly agitated, glancing, conflicting, and colliding gas flow of the present invention is the general upward flow path the gas will follow, as shown in FIG. 6a and 6b, through top gas egress opening 12, as the gas exits the top of oven cavity 2. This upward gas flow draws also the gas from lower gas discharge sections 18a and 18b thereby scrubbing the bottom of the food product, pot, pan or other cooking vessel, by pulling gas flow around the sides of said vessel, further enhancing the heat transfer, as well as drawing the gas that scrubs the upper surface up towards the oven cavity top wall.

Returning to FIG. 2, top gas discharge plates 23a and 23b are positioned within oven cavity 2 such that the gas flow from top gas transfer section 17a conflicts and collides with the gas flow from top gas transfer section 17b upon the food product surface and strikes the food product at an angle that is between zero degrees and 90 degrees as referenced from the horizontal top wall (where zero degrees is parallel to the horizontal top wall) and lower gas discharge plates 27a and 27b are positioned within oven cavity 2 such that the gas flow from lower gas transfer section 18a conflicts and collides with the gas flow from lower gas transfer section 18b upon the lower surface of the food product at an angle that is between zero degrees and ninety degrees as referenced from the horizontal bottom wall. Various cooking requirements may require that the angles of the gas discharge plates 23a, 23b, 27a and 27b be adjusted, either during manufacture, or adjustable within the unit after manufacture, in order for the chef or cook to change gas flow velocity angles (vectors) to effect different cooking profiles.

The number and placement of the apertures 100a, 100b, 29a and 29b will vary according to the particular oven that is required. As described herein, this invention is "scalable" and as used herein the term scalable has the meaning that the technology will provide for a platform of products, not merely one particular size or one particular product. If, for example, a speed cooking baking oven were desired (as opposed to a general purpose speed cooking oven which cooks proteins, baked products, etc.) the apertures may be larger, but fewer in number. This would allow for a more gentle gas flow field across the food product, and therefore more delicate baking of the food product. If a browning oven were desired, the apertures may be more numerous and smaller in diameter. Additionally, the operator may desire flexibility of cooking and in this circumstance, gas discharge plates 23a, 23b, 27a and 27b may be fabricated in a manner that allows for change-out of the plates. As used herein the term aperture refers to irregular slots, irregular holes or irregular nozzles, regularly formed slots, regularly formed holes or regularly formed nozzles or a mixture of regularly formed and irregularly formed slots, holes or nozzles. FIG. 2 illustrates the use of three rows of apertures 100a and 100b on the top side gas flow systems, gas delivery sections 17a and 17b, and two rows of apertures on the lower side gas flow systems 18a and 18b although more rows and numbers of apertures or fewer rows and numbers of apertures may be utilized for sections 17a, 17b, 18a and 18b.

Figure 5:
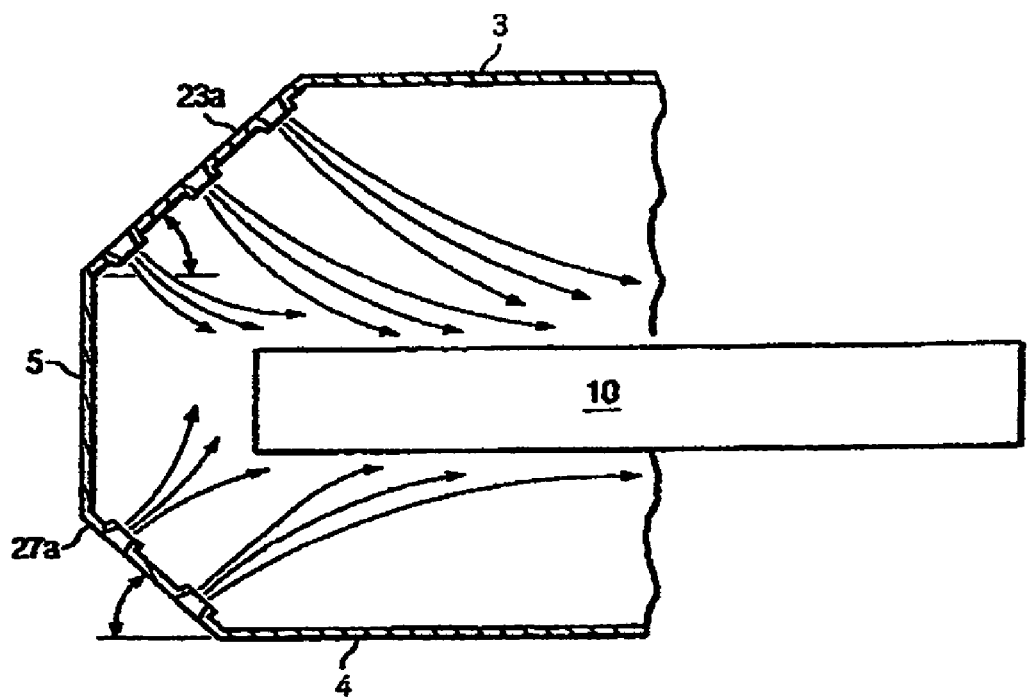
FIG. 5 is a front view illustration of microwave electromagnetic fields

The gas delivery system as illustrated in FIG. 6 produces aggressive glancing, conflicting and conflicting gas flow patterns 30a and 30b wherein a gas flow is directed onto the top surface of the food product. An aggressive top glancing, conflicting and colliding gas flow pattern 30a also interacts with the left top portion and left top side portion of food product 10 and a similar right top glancing, conflicting and colliding gas flow pattern 30b interacts with the right top portion and top right side portion of food product 10. As seen in FIG. 6a, gas flow is also directed to the lower gas transfer sections 18a and 18b. As such, an aggressive glancing, conflicting and colliding gas flow patterns 31a and 31b interact with the lower left and right portions of the food product. This cooking profile creates high heat transfer capability by using the irregular surface of the food product, as well as the interference of flow fields to minimize boundary layer growth. As seen in FIG. 5, the angle of the gas flow velocity vector leaving the top left and top right discharge plates 23a and 23b respectively, and the bottom left and bottom right discharge plates 27a and 27b respectively, is between zero degrees and 90 degrees from horizontal bottom wall 4. After the aggressive glancing and conflicting gas flow patterns 30a and 30b contact or strike the food product they are exhausted through top egress section 12 and cycle back through the oven as described herein.

The gas flows within the oven, as well as other functions of cooking appliance are directed by controller 34, FIG. 2. Controller 34 determines, among other things, the velocity of gas flow, which may be constant or varied, or, may be constantly changed throughout the cooking cycle. It may be desired to cook the food product on one velocity throughout the entire cooking cycle, or to vary the gas velocity depending upon conditions such as a pre-determined cooking algorithm, or vary the velocity in response to various sensors that may be placed within the oven cavity, oven return air paths or various other positions within the oven. The location and placement of said sensors will be determined by the particular application of the oven. Additionally, other means may be utilized wherein data is transmitted back to controller 34, and thereafter controller 34 adjusts the cooking in an appropriate manner. For example sensors (temperature, humidity, velocity, vision and airborne chemical mixture level sensors) may be utilized to constantly monitor the cooking conditions and adjust the gas flow accordingly within a cooking cycle, and other sensors not described herein may also be utilized. The speed cooking oven may utilize sensors that are not currently commercially utilized (such as laser, non-invasive temperature sensors and other sensors that are currently too expensive to be commercially feasible), and the speed cooking oven is not limited to those discussed herein, as many sensing devices are known and utilized in the cooking art.

The gas flow performance may also be adjusted as a function of available power. In the event, for example, the heating system in an all electric speed cooking oven is requiring or utilizing a large amount of power (larger than available power levels which may vary according to location and local code and ordinance) it may be desirable for the controller to reduce electrical power to the convection heaters or other electrical components accordingly in order to conserve available power. Indeed, in certain parts of the world where power is limited or capped, for example Japan and Italy, the oven of the present invention can be designed to adjust to these limiting conditions. In a speed cooking gas fired unit, some systems will be powered by electric current, but the electric power requirements will not be as high as required for an all electric oven because the energy required for gas heating and cooking will be provided by the combustion of a hydrocarbon based fuel. In this event a controller may not be required, indeed knobs or dials may be utilized.

Managing the gas flow pattern in a speed cooking oven is important relative to controlling the local convection heat transfer rate at the food product. Many food products cooked in a typical rapid cook oven require that the energy into the food (whether the energy be microwave, impingement gas, halogen light or other energy) be "tailored" (distributed) over the entire cooking cycle. This tailoring or modulation of both the microwave and the convection energy systems is an important feature in achieving a rapidly cooked food product with high food quality. For example, a food product such as a pizza may require as much as 30 minutes to cook in a conventional oven, but can be cooked in as little as 3 minutes in a speed cooking oven. During this three minute cooking cycle, the controller may be programmed with an overall routine of cooking instructions that is broken down into sub-routines or events. As such, in a cooking profile, several different "sub-routines" may be utilized to attain the final rapidly cooked food product. The cook cycle may, for example begin with 20 seconds of high velocity gas flow wherein the gas flow is delivered at 100% velocity and the microwave output is 10% of total microwave capacity. This cycle may then, for example, be followed with 10 seconds of cooking time wherein 10% gas flow is utilized and no microwave power is used. This may then be followed by 1 minute wherein 100% gas flow and 100% microwave power is used, followed by, for example, one minute wherein 50% microwave power is used and 50% gas flow is utilized. These speed cooking ovens therefore require a sophisticated control mechanism that is expensive and can be a source of reliability problems and variable speed blowers have therefore been used in order to control, for example, vertical impingement air flow and as previously described, this approach is expensive because dynamically braking speed variable blower motor speed controllers are required, adding complexity and cost to the appliance. In addition, using air flow rates that vary from low flows to high flows requires "over-design" of oven components such as convection heaters, grease control systems, blowers, blower motor controllers and nozzle plates because the parts must work equally well together at low flow conditions as well as at high flow conditions.

Although the present invention may utilize variable speed blower motors and variable speed blower motor controllers, there is no requirement for their use and the speed cooking oven of the present invention avoids these problems, and the complexity of the variable speed blower motors, by maintaining a substantially constant gas glow rate through the oven cavity, gas transfer and gas delivery sections. FIG. 6 shows two illustrative gas flow patterns wherein aggressive gas flow patterns 30a and 30b are shown and less aggressive gas flow patterns 31a and 31b are illustrated in FIG. 6b. One means to achieve this gas flow pattern modification is by use of a gas pumping means, in this illustration, a blower motor, blower wheel combination, utilizing a controller or a multi speed switch that allows for the switching of the blower motor speed in pre-determined fixed increments. Heating of the convection gas is provided by either electric resistance heating means 14a and 14b or by a direct fired (product of combustion mix with oven gas) means. The heater is configured such that it can be operated at a lower heat flux for the convection heating and cooking mode, or at a higher rate for radiant heating and cooking. The radiant heating will also provide convection heat for cooking. The purpose of the radiant feature is to provide additional surface browning.

Figure 9A:
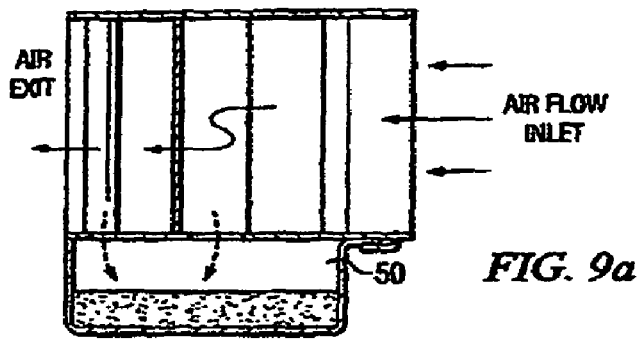
FIG. 9a is a side view of grease extractor
Figure 9B:
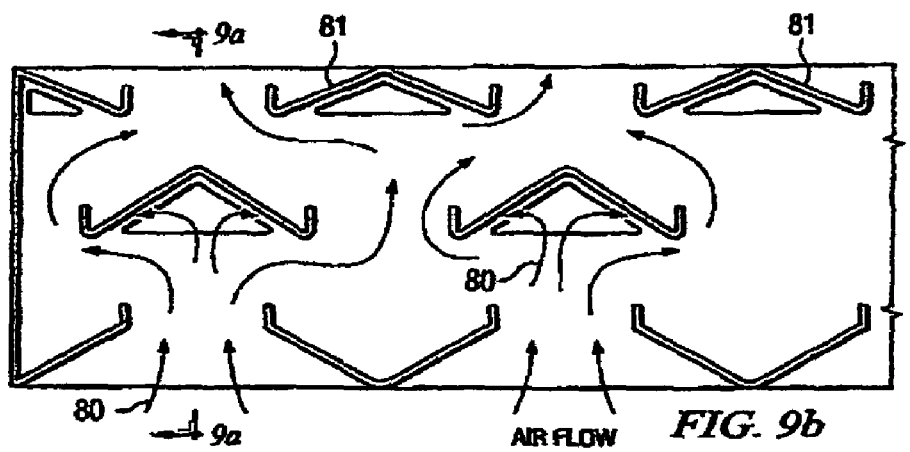
FIG. 9b is a top view of grease extractor

The speed cooking process produces a high grease generation rate because the amount of grease or liquids that are produced during a rapid cook operation is approximately the same as conventional cooking, but the grease load is produced in $\frac{1}{5}^{th}$ to $\frac{1}{7}^{th}$ and in some instances $\frac{1}{10}^{th}$ the time of conventional cooking times. This results in high grease loading (e.g. ounces/minute) of the gas flow stream which, if not treated, may cause a number of problems including (a) smoke generation, as grease particles impact hot surfaces, (b) soiling of interior gas transfer and delivery surfaces, which may be bidden and difficult to clean, and (c) grease contamination of the food product itself from the re-circulated air flow. Impingement style air flow amplifies this effect by throwing or entraining grease and other liquids that ultimately collect in the grease catch container around the food product. The gas flow of the present invention greatly reduces this effect by not allowing the gas flow to impinge on the liquid coated pan, cooking vessel or food surfaces. In order to control the grease and other liquids produced by the speed cooking process, the first method employed is the particle removal of the grease. Grease in vapor form is much less of an issue because there are no cool walls within the oven for vapor condensation of the grease or liquid. Referring now to FIG. 2 and FIG. 4, left grease extractor 13a and right grease extractor 13b are positioned downstream of left thermal heating means 14a and right thermal means 14b respectively. The gas flow passes over left and right thermal means 14a and 14b before passing through left and right grease extractors 13a and 13b. In order to control grease and other liquid particles, grease extractors 13a and 13b are designed, FIG. 9b, to provide a convoluted gas flow path, 80 wherein the average flow velocity maintained is in the approximately 2000 ft/minute to approximately 6000 ft/min range. This method will extract a substantial amount of the grease particles with mean diameters greater than approximately 3.0 micrometers. Grease extractors 13a and 13b have a proximal end towards the front of oven cavity 2 and a distal end towards the back wall of oven cavity 2 wherein the distal end is positioned slightly lower than the proximal end to allow grease to flow by means of gravity to the back wall of oven cavity 2 where it is collected within a grease collection means 50, FIG. 9a, or otherwise removed completely from the oven via a tube, channel or other means that allows the liquid grease to collect in a collection device separate and apart from the speed cooking oven. Grease extractors 13a and 13b consist of a series of baffles or troughs 81 that rapidly accelerates (change of direction) the flow 80 as the gas flow bends around the flow diverters. Larger or heavier grease particles with the highest inertia cannot be sufficiently accelerated to follow the flow as the flow passes through the diverters. As a result, the grease particles impact the diverter walls. The collection point is the valley or trough, which both prevents re-entrainment of the grease into the air stream and also acts as a grease channel to remove grease from the oven cook cavity. This aerodynamic method of grease removal relies on the pressure drop associated with the turning of the flow through the baffles. This design achieves approximately 90% removal efficiency of 3 micrometer or greater grease particles, while requiring less than approximately 1.5 inches of water column gas flow pressure drop across the grease particle removal sections 13a and 13b. The flow area restriction is designed to accelerate the gas flow prior to the flow diverters and to slow the gas flow after said flow exits the valleys of the trough.

The most efficient utilization of the spent hot gas is by re-circulation of the gas flow through the oven cavity many times during a cooking cycle. During normal speed cooking it may be desirable for one food product to be cooked after another different type of food product (fish followed by pastry) with successive cycles continuing. For example shrimp may be cooked first, followed by a baked product or pastry. Without appropriate filtration, the odors from the shrimp will contaminate the baked product, producing an undesirable taste and odor in the pastry. There exists a need for further air clean-up (in addition to the grease extractors) to further scrub the gas flow of the particles that are not entrained by grease extractors 13a and 13b. In instances wherein further filtration of the gas flow is desired, odor filters may be placed within the oven cavity. FIG. 2 illustrates the use of odor filters 40a and 40b for this purpose. Left side odor filter 40a is attached within top left gas transfer section 17a, downstream of left grease extractor 13a and right odor filter 40b is attached within right gas transfer section 17b downstream of right grease extractor 13b. Odor filters 40a and 40b are attached in a manner that allows for their easy removal for cleaning and replacement. Gas that flows into the left and right gas transfer systems 15a and 15b first passes through odor filters 40a and 40b. The gas flow is therefore further scrubbed after passage through grease extractors 13a and 13b in order to eliminate odors that could interfere with the proper taste of the food product currently being cooked. In some cases it may be beneficial to utilize a second set of odor filters, and these filters may be placed anywhere within the gas flow path downstream of blower wheels 16a and 16b. Odor filers 40a may be catalytic type elements or other filtration means including, but not limited to activated charcoal, zeolite or ultra violet wavelight light. It is beneficial that the odor filters be comprised of a material, or materials, that effectively scrubs, or cleans the gas flow with a minimal amount of interference with the gas flow velocities. Additionally, it is beneficial that the odor filters be easily removed, easily cleaned and inexpensive for the operator to replace.

Figure 8:
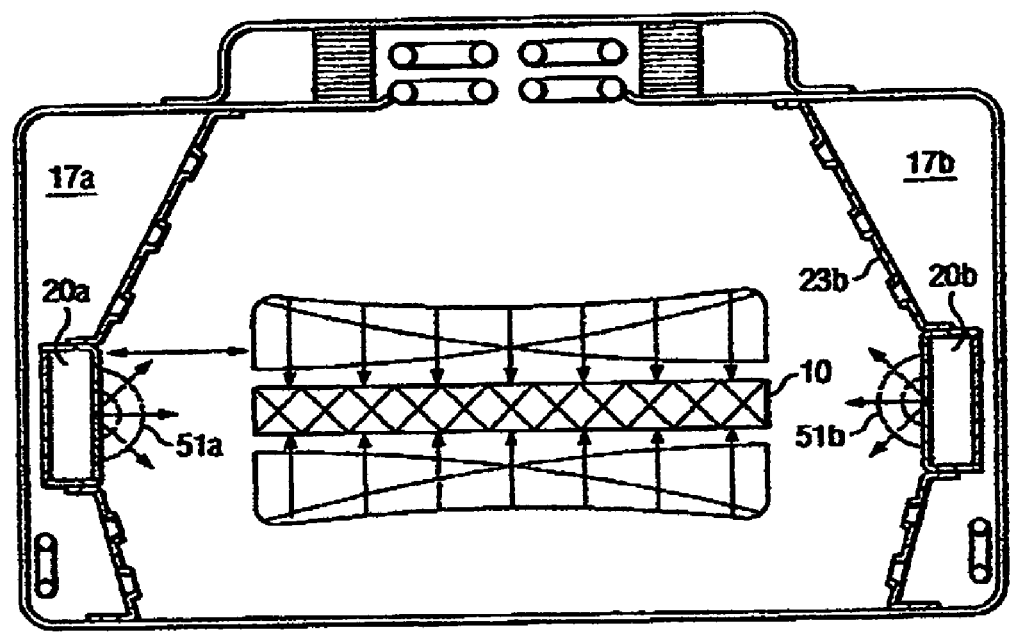
FIG. 8 is a front elevation view of microwave energy distribution

The oven of the present invention may also utilize microwave energy to at least partially cook the food product. As seen in FIG. 2, left side microwave launching waveguide 20a is attached within oven cavity 2 to left side wall 5 between top left gas transfer section 17a and lower left gas transfer section 18a. Right side microwave launching waveguide 20b is attached within oven cavity 2 to right side wall 6 between top right gas transfer section 17b and lower right gas transfer section 18b. The microwave waveguides are designed to distribute microwave power uniformly from the back to the front of oven cook cavity 2. As shown in FIG. 8, such a configuration promotes uniform illumination of microwave energy to the right side and the left side of the cook chamber because the microwave energy from the side walls is additive over the product. The vertical distance above cavity bottom wall 4 of waveguides 20a and 20b is such that, under normal cooking conditions, approximately more than ⅓% of the microwave energy is available below cooking rack 8a, with the balance of microwave energy available above cooking rack 8a.

Metal cooking devices such as cooking pans, cookie sheets and other metal cookware is traditionally used in conventional cooking. Because microwave energy cannot penetrate these metal devices, all of the microwave energy must enter the top and side surfaces of the food product. To overcome the issue that metal pans create, some ovens utilize a top launch microwave system. The theory has been to provide microwave energy through the top surface of the food product, but this application of microwave power applies excessive microwave energy to the top of the product, causing over cooking, producing a tough, rubbery food product. The overcooking problem is especially acute when cooking proteins, such as meat. In order to prevent this microwave overcook condition, one method historically utilized was a reduction of the microwave energy that is available for cooking the food product. The result of limiting the microwave energy to the food product is that the microwave energy is more evenly distributed over the cook cavity, but this reduction in applied microwave energy results in a slower cook process, defeating the desire for a speed cooking oven.

Figure 11:
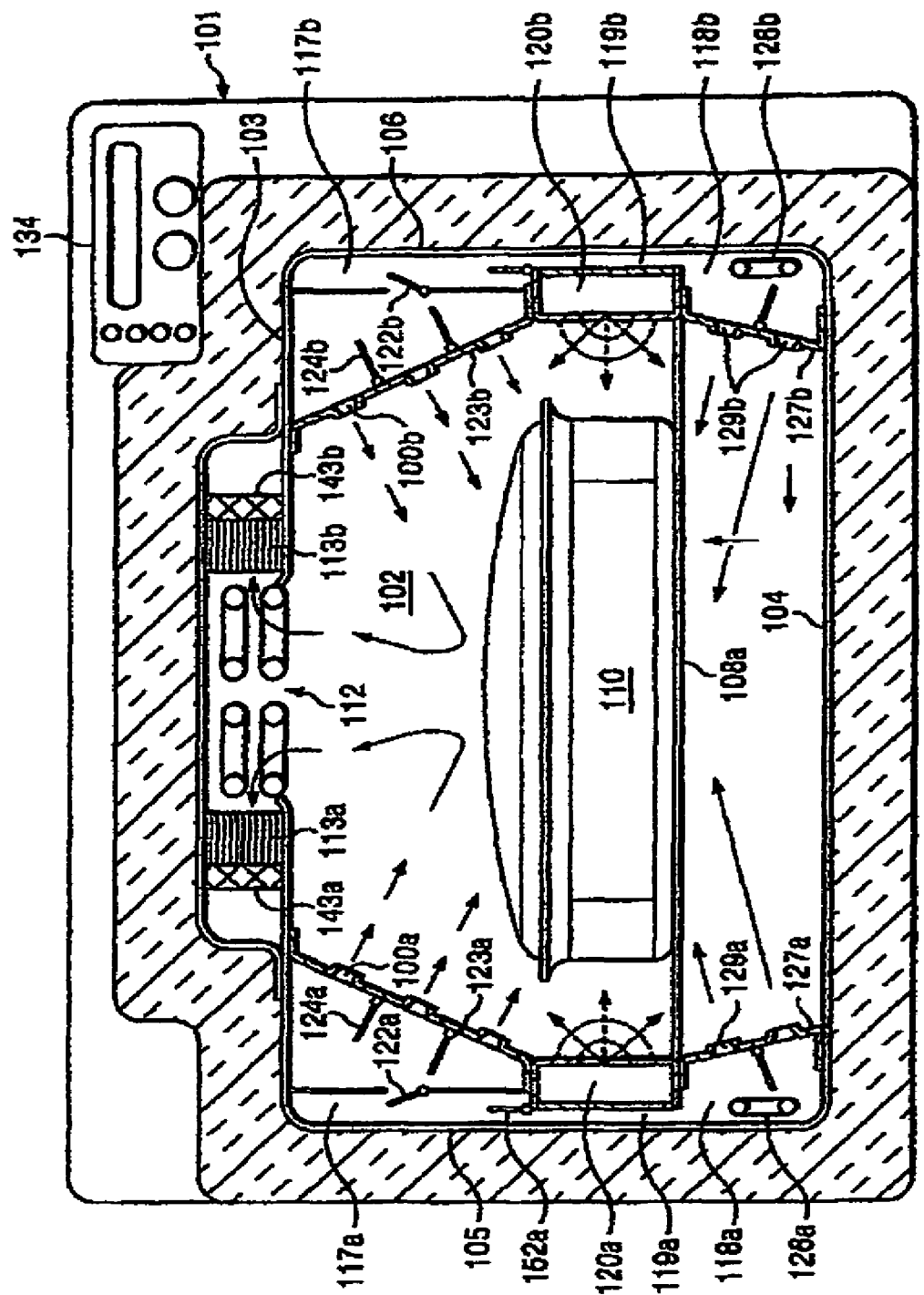
FIG. 11 is a front elevation of single rack oven with gas flow control

Other methods of distributing microwave energy launch microwave energy from below the food product. This is not optimum because microwave energy that is to enter the upper surface of the food product must bounce around within the oven cavity in a random and inefficient manner in order to enter the top side of the food. As shown in FIG. 11, microwave energy is broadcast from waveguide 20a into oven cavity 2 via a slotted antenna 70 wherein three or four narrow apertures (slots) 70a, 70b, 70c, 70d are spaced along the waveguide. Various configurations for microwave distribution have been utilized with varying results. Food product 10 is placed within oven cavity 2 a distance of at least 2.4 inches (for optimal cooking uniformity) from left side wall 5 and right side wall 6. The 2.45 inch measurement corresponds to one half a microwave wavelength or 2.4 inches (for optimal cooking uniformity) (E field null) for a 2.45 GHz microwave tube (microwave) frequency. This spacing permits the E-field 51a and 51b FIG. 8, to expand and become more uniform prior to coupling with the food product.

The right side microwave system is identical to the left side system and microwave energy is broadcast from right waveguide 20b to oven cavity 2 via a slotted antenna as previously described for the left side. The microwave energy field therefore propagates through the oven cavity in an evenly distributed pattern, coupling with the food product from all directions, and providing an even electromagnetic energy distribution throughout the oven cavity without the need for a mechanical stirrer to propagate the electromagnetic field.

Waveguides 20a and 20b are located on the left and right side walls of the oven, and therefore do not interfere with oven cavity spent gas exhaust.

The microwave waveguides are located on the side walls of the oven cavity, and are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip.

As seen in FIG. 2, bottom wall 4 has a smooth, continuous bottom that is easy to clean with no heating elements, air return ducts or microwave launchers within the oven cavity floor. In instances where air return means, heating elements and microwave launchers protrude through the oven floor it is very difficult for an operator to clean and maintain the oven in a sanitary condition. In a bottom launch microwave system, the waveguide launcher is generally located within the center portion of the oven cavity bottom wall. As grease, oils and other by-products of the cooking process are released during normal cooking, they drip and splatter onto the microwave launcher. The launcher must be protected and is covered with a microwave transparent material such as quartz and sealed with adhesives or other sealants in an effort to prevent contaminants from entering the launcher, causing pre-mature breakdown of the magnetron. Additionally, some speed cook ovens have located upon the bottom wall a radiant element to assist with bottom side browning. For commercial applications an exposed lower radiant element may result in safety issues as grease builds up around the hot element.

The present invention utilizes a smooth oven cavity floor that does not allow for the contamination of the microwave system, the gas re-circulating system or the wave guide launcher by grease and other by products of the cooking process that drip or spill from the cooking containers. Gas discharge plates 23a and 23b, FIG. 2, are located in the corners of the oven with the apertures 29a, 29b located above the oven floor. The microwave launching system is affixed between gas transfer sections 17a and 17b on the left side and 18a and 18b on the right side. As such, the bottom of the oven cavity is left as a continuous, unencumbered surface. Apertures 29a and 29b are positioned above oven bottom wall 4 and cleaning of the oven floor is therefore easily achieved. Additionally, plates 27a and 27b can be manufactured to be removable from lower gas transfer sections 18a and 18b for cleaning or replacement. Radiant elements 103a and 103b, are located within gas transfer sections 18a, and 18b and will therefore not be contaminated by food spills, grease and cooking by-products that splatter and drop from the cooking rack.

Although the present invention has been described in considerable detail with reference to certain preferred versions thereof, other versions are possible. For example, various sizes of commercial and residential speed cooking ovens may be made. In these cases larger or smaller component parts may be utilized and fewer or more components may be employed. In the case where it is desirable to make a smaller speed cooking oven, one gas flow acceleration means may be utilized instead of two; one microwave system utilized instead of two; smaller or fewer thermal devices, whether electric resistance or gas fired may be used. In cases wherein it is desirable for a larger speed cooking oven, multiple rack units may be developed and additional gas flow systems and microwave systems may be added to accomplish a larger cavity, multi rack speed cooking oven. Other modifications and improvements thereon will become readily apparent to those skilled in the art. Accordingly, the spirit and scope of the present invention is to be considered broadly and limited only by the appended claims, and not by the foregoing specification.

Any element in a claim that does not explicitly state "means for" performing a specific function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, To summarize, the present invention provides for a speed cooking oven utilizing hot gas flows, hot gas flows coupled with microwave energy in order to achieve speed cooking of food products five to ten times faster than conventional cooking methods at quality, taste and appearance levels that are equal to and exceed conventional cooking. The oven is operable on standard commercial power and residential supplies and is simple and economical to manufacture, use and maintain, and is directly scalable to larger or smaller commercial and larger or smaller residential embodiments. The speed cooking oven may operate as a speed cooking air only oven, a microwave oven or a combination air and microwave speed cooking oven. Additionally, the invention may be practiced wherein no gas diverters are utilized, such as in the exemplary embodiment, gas deflection means are utilized as in the second embodiment, and the invention may also be scaled and an example of a scaled up unit has been provided as a multi rack oven. Many and various other combinations are possible. For example, the embodiments illustrated herein may utilize gas deflection means, or be practiced as illustrated in the exemplary embodiment with no gas deflection means. The invention may be practiced using various gas delivery means other than those illustrated herein.

Also, various sizes of commercial and residential speed cooking ovens may be made and the invention is not limited to the embodiments described herein. In the instances wherein larger or smaller ovens are to be practiced, larger or smaller component parts may be utilized; and fewer or more components may be employed. In the case where it is desirable to make a smaller speed cooking oven, one gas flow acceleration means may be utilized instead of two; one microwave system utilized instead of two; smaller or fewer thermal devices, whether electric resistance or gas fired may be used. In cases wherein it is desirable for a larger speed cooking oven, multiple rack units may be developed and additional gas flow systems and microwave systems may be added to accomplish a larger cavity, multi rack speed cooking oven. Apertures may be made larger or smaller depending upon the gas flow requirements of a practiced version. The heating means 14a and 14b may be combined into one heating element, or more than two heating elements may be utilized.

Second Version

An second version of the speed cook oven with gas control and deflecting means is shown as a stand alone commercial cooking appliance with gas flow control, but it is obvious to those skilled in the cooking art that this stand alone speed cooking appliance may exist in many other commercial and residential embodiments (e.g. counter-top oven, wall-oven, single rack oven, multi-rack oven) because the speed cook oven with gas flow control is scalable up or scalable down. As used herein, the term "scalable" has the meaning that additional larger commercial and residential and smaller residential and commercial embodiments can be developed and the invention is not limited to a certain size or particular design. Of course each embodiment may have different size characteristics and require different voltages of electricity—as commercial power supplies are generally different than residential power supplies. This speed cook oven is therefore not limited to commercial uses only, and is equally applicable for residential (home) use. With initial reference to FIGS. 11-15, a speed cook appliance 101 is schematically shown in the form of a stand alone commercial counter top cooking appliance. As used herein, the term "commercial" includes, but is not limited to, the commercial food service industry, restaurants, fast food establishments, quick service restaurants, convenience stores (to list a few) and other mass feeding establishments and the term "residential" refers, generally speaking, to residential applications (home use), although the term is not limited to residences only, but refers to non-commercial applications for the speed cooking oven.

Appliance 101 includes an oven cavity 102 generally defined by a top wall 103, a bottom wall 104, left side wall 105, right side wall 106, a back wall 194 and a front wall 195. Oven cavity 102 also has associated therewith an access opening 107 through which food items 110 may be placed within oven cavity 102 upon cooking rack 108a, FIG. 11. Although shown as a countertop oven with one rack 108a, supported by side walls 105 and 106, the invention may be practiced wherein multiple racks are utilized. Although the cooking rack 108a is shown as supported by side walls 105 and 106, it is obvious to one skilled in the cooking art that rack 108a may be a free-standing cooking rack not supported by the side walls. Cooking appliance 101 has a hinged door 109 pivotally attached to the oven front for closing the cooking section opening 107 during cooking operation. Hinged door 109 may be swung between an open position wherein the door allows access to oven cavity 102 and a closed position wherein the door covers the opening into oven cavity 102. Although illustrated as a hinged door pivotally attached at the left side of the front of the oven, the door may be hinged on the right side, bottom side or top side.

Figure 12:
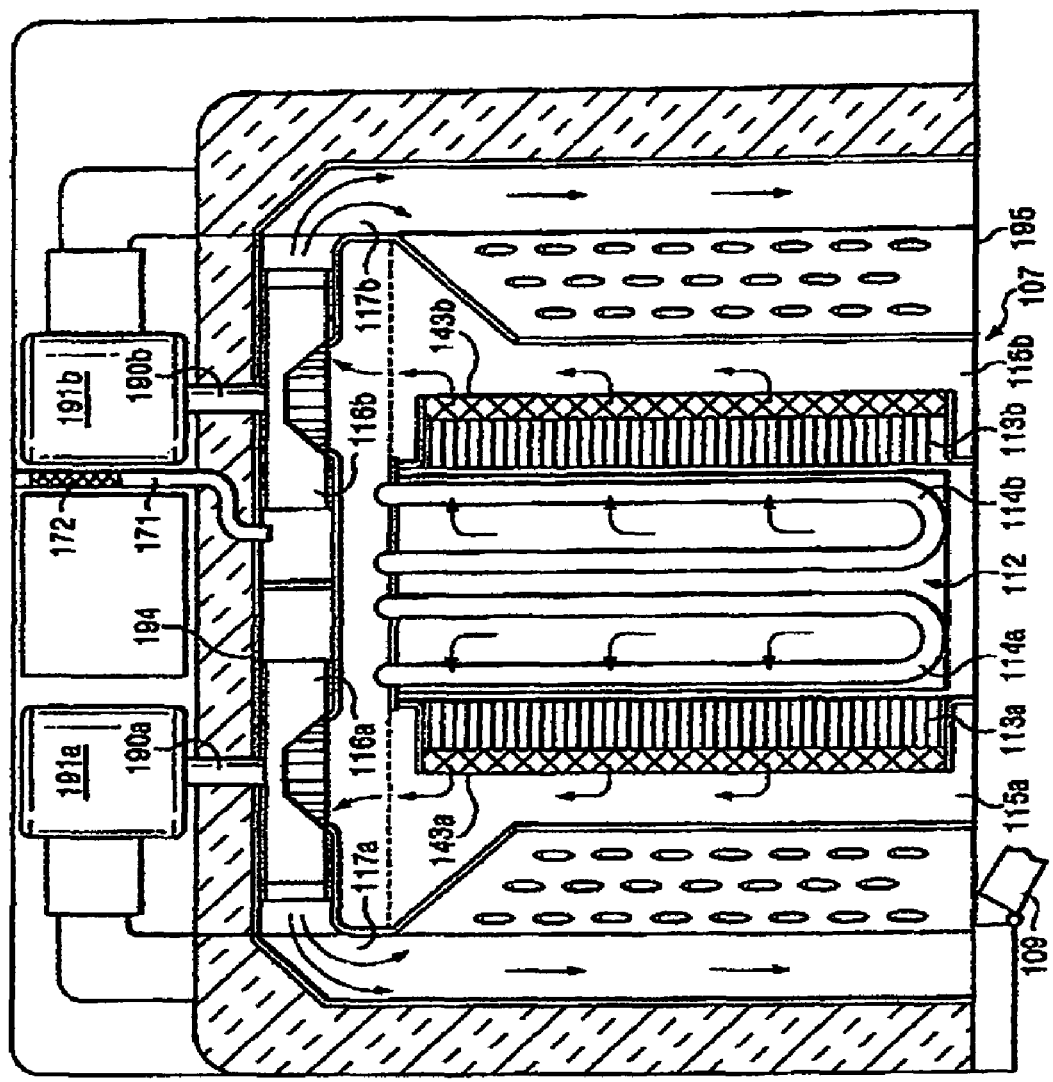
FIG. 12 is a top view oven with gas flow control

Referring now to FIG. 12, the speed cooking oven is comprised of two independent gas transfer systems, described herein as a left gas transfer system and a right gas transfer system wherein left gas transfer system delivers gas to and from the left side of the oven cavity 102, and right gas transfer system delivers gas to and from the right side of the oven cavity 102. Although each gas transfer system is described separately, the systems are identical in their configuration and operation and serve to distribute gas to the respective sides of oven cavity 102. Oven cavity 102 also has associated therewith vent tube 171, FIG. 12, which allows for the passage of vent gas from oven cavity 2 to atmosphere. Affixed within vent tube 171 is odor filter 172, which provides for the removal of odors caused by the cooking process. Various materials may be utilized for odor filter 172 and varying materials with varying efficiencies may be utilized. For example, in some instances it may be desirable for odor filter 172 to completely filter all odors, while at other times it may be desirable to provide for a less efficient odor filter 172 in order to allow for the passage of some cooking odors. It has been found that during the cooking process, for example baking bread or cookies, the cook has an expectation of smelling bread cooking and it may not be desirable to completely filter all odors.

Gas is transferred to and from the left side of oven cavity 102 via a left gas transfer system, which is comprised of a left gas transfer section 115a, extending from the front to back of oven top wall 103, along the left side of top wall 103. In fluid connection with left gas transfer section 115a is top gas egress opening 112, which is open to, and in fluid connection with oven cavity 102 through top wall 103. Top gas egress opening 112 is substantially rectangular, although other geometries may be utilized, and is centrally located within oven top wall 103 and provides for the passage of gas from oven cavity 102 into left gas transfer section 115a, as gases are removed from oven cavity 102 through top egress gas egress opening 112. Located within left gas transfer section 115a is left grease extractor 113a. As gas is drawn through top gas egress opening 112, the gas passes across left heating means 114a, prior to entry in and through left grease extractor 113a. Heating means 114a may include a direct fired thermal energy source, indirect fired thermal energy, propane, natural gas, electric resistance heating elements, and other thermal means, and applicant intends to encompass within the language any structure presently existing or developed in the future that performs the same function. After the gas is drawn across left heating means 114a and through left grease extractor 113a, it is then drawn through left odor filter 140a and into left gas transfer section 115a. Alternate locations for left odor filter 140a can be utilized within the gas flow path and the location of the left odor filter 140a adjacent left grease extractor 113a is not required. In fluid connection with, and located within left gas transfer section 115a is a left gas accelerator, illustrated as left blower wheel 116a. Connected to left blower wheel 116a is blower motor shaft 190a, which is driven by a direct shaft from electric motor 191a. Other means may be employed for coupling blower wheel 116a to electric motor 191a, such as belt drive, and the means is not limited to direct drive. Blower wheel 116a takes gas from oven cavity 102 and delivers the gas via gas transfer section 117a to the left top side of oven cavity 102. Although illustrated as a conventional blower motor, blower motor shaft and blower wheel, other gas pumping means such as a compressor may be utilized to re-circulate gas to and from oven cavity 102 and applicant intends to encompass within the language any structure presently existing or developed in the future that performs the same function. Top left gas transfer section 117a is in fluid connection with a lower left gas transfer section 118a via a left vertical gas transfer section 119a. Left vertical transfer section 119a is bounded by left side wall 105 and a left microwave waveguide section 120a.

Figure 13:
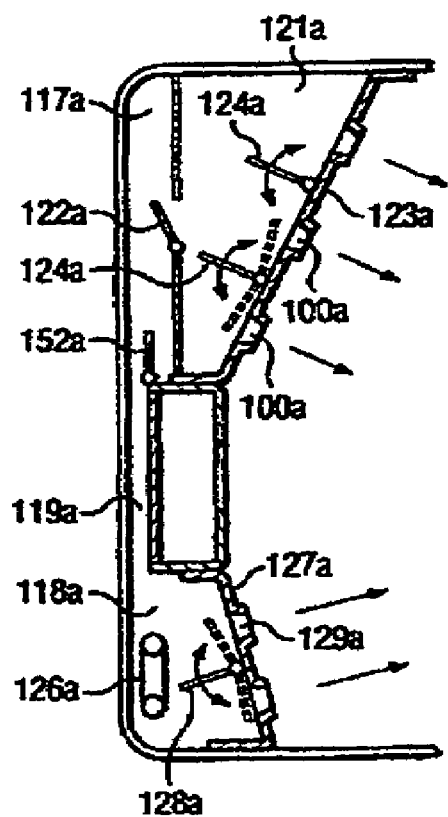
FIG. 13 is a left side section detail of gas flow control

As gas is discharged into top left gas transfer section 117a, a selected portion of said gas is directed into a top left discharge section 121a by a top left deflecting means 122a, FIG. 13 shown in the open position. Thereafter the gas is discharged through apertures located within a top left slotted or perforated discharge plate 123a. Gas is then distributed into oven cavity 102. Apertures 100a may be slotted, regularly formed or irregularly formed apertures and are illustrated herein as nozzles, 100a and 129a, to be discussed herein, and applicant intends to encompass within the language any structure presently existing or developed in the future that performs the same function as 100a, 29a and to be discussed further herein 100b and 29b. Gas is distributed through various apertures 100a located within left discharge plate 123a and delivered onto the left top and left side portions of the food product 110. As gas enters top left gas delivery section 121a, said gas may be further deflected via a top left gas deflecting means 124a as shown in FIG. 13 in the open position. Gas deflecting means 124a is pivotally attached to gas discharge plate 123a, although, other means for accomplishing said gas deflection may be utilized. For example means such as normally open, normally closed, or normally partially open and normally partially closed switched plates may be used (wherein said plates slide along the inside of perforated plate 123a to limit the aperture openings 100a of discharge plate 123a), and applicant intends to encompass within the language any structure presently existing or developed in the future that performs the same function. Gas that has not been discharged or deflected into top left gas delivery section 121a by gas deflecting means 122a flows to lower left gas transfer section 118a via vertical transfer section 119a. Pivotally attached to waveguide section 120a is a lower gas transfer deflection mechanism 152a, FIG. 13 that operates to limit the amount of gas that is transferred to lower gas transfer section 118a. As used herein, the terms "flow control means" "gas deflecting means" "transfer deflection mechanism" and "flow control means" all have the same meaning and refer to means to control gas flow within the oven. Indeed, certain speed cooking operations may call for more gas flow to the lower part of the speed cooking oven, while other operations will call for little or no gas flow to the bottom side of the oven for delivery to the bottom of the food product. In those instances where little or no gas flow is desired upon the bottom surface of the food product, gas transfer deflection mechanism 152a may be closed in order to allow all, or substantially all, of the gas flow into top left gas delivery section 121a.

Figure 14A:
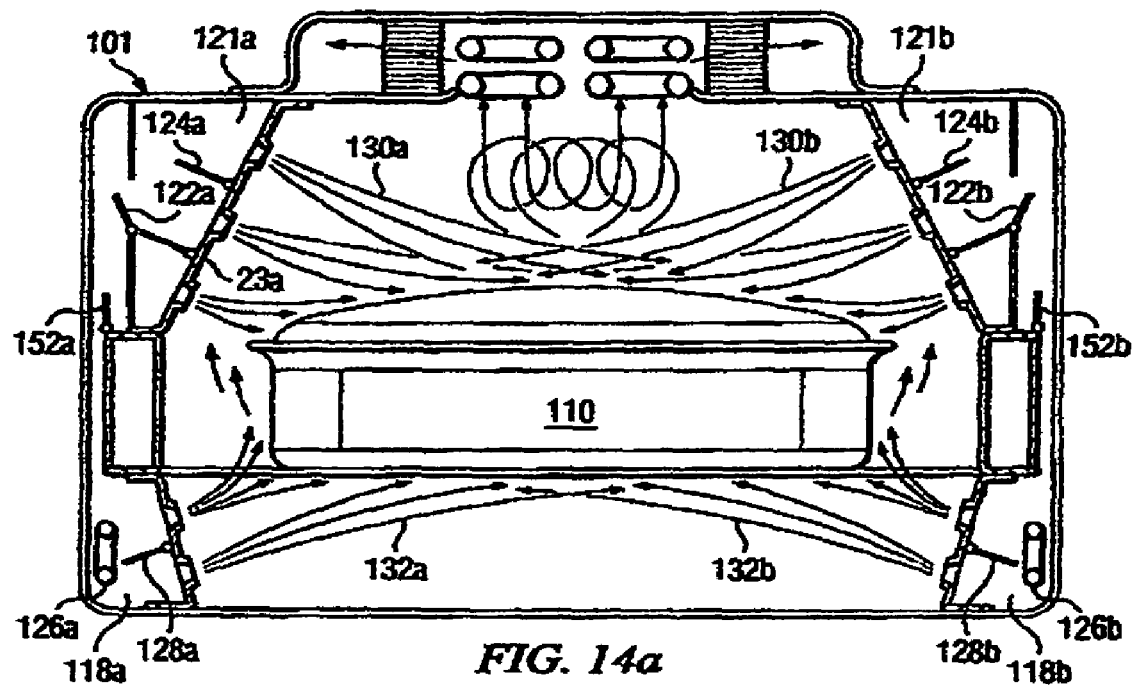
FIG. 14a is a front view of oven gas flow control with aggressive gas flow

Gas that flows to lower left gas delivery section 118a may be re-heated, if required, by lower left heating means 126a, FIG. 13. After passing over heating elements 126a, the gas may be further deflected by deflecting means 128a, FIG. 13, shown in the open position. As gas deflecting means 128a is rotated, directional control of the gas flow may be further refined, allowing for gas flow to pass through the upper or lower rows of apertures of lower gas plate 127a at various positions along food product 110 bottom surface, FIG. 14b. Although gas deflecting means 128a is shown as pivotally attached to left slotted or perforated gas discharge plate 127a, gas deflecting means 128a is not limited to the pivotally attached means illustrated herein, and as described elsewhere herein, applicant intends to encompass within the language any structure presently existing or developed in the future that performs the same function. Apertures 100a, 100b, 129a and 129b are sized for low pressure drop, while providing and maintaining sufficient gas velocities of approximately 2000 ft/minute to approximately 6000 ft/minute to properly cook the food product, although velocities above 6000 ft/minute may be used and velocities less than 2000 ft/minute may also be utilized. As shown in FIG. 14a, the apertures are adjusted such that the majority of the gas is supplied from the top left gas discharge section 121a. The resulting imbalance of gas flows between the top left gas flow 130a and lower left gas flow 132a is desirable because the top flow 130a must aggressively remove moisture produced and escaping from the top surface, and top side surface of food product 110. The imbalance also serves to heat, brown and/or heat and brown the food product 110.

Referring now to the right gas transfer system, FIG. 12, gas is transferred to and from oven cavity 102 via a right gas transfer system, which is comprised of a right gas transfer section 115b, which extends from the front to back of oven top wall 103, along the right side of top wall 103. In fluid connection with right gas transfer section 115b is top gas egress opening 112, which is open to, and in fluid connection with oven cavity 102 through top wall 103. Top gas egress opening 112 is substantially rectangular, although other geometries may be employed, and is centrally located within oven top wall 103 and provides for the passage of gas from oven cavity 102 into right gas transfer section 115b, as gases are removed from oven cavity 102 through top egress gas egress opening 112. Located within right gas transfer section 115b is right grease extractor 113b. As gas is drawn through top gas egress opening 112, the gas passes across right heating means 114b, prior to entry in and through right grease extractor 113b. After the gas is drawn across heating means 114b and through right grease extractor 113b, it is then drawn through right odor filter 140b and into right gas transfer section 115b. Heating means 114a and 114b may be combined into one heating element, or more than two elements may be utilized depending upon the particular requirements of the oven, and applicant intends to encompass within the language any number of electric resistance heating elements that performs the same function. Alternate locations for right odor filters 140a, 140b can be utilized within the gas flow path and the location of the right odor filter adjacent to right grease extractor 113b is not required. In fluid connection with, and located within right gas transfer section 115b is a right gas accelerator, illustrated as right blower wheel 116b. Connected to right blower wheel 116b is blower motor shaft 190b, which is direct drive with electric motor 191b. Other means may be employed for coupling blower wheel 116b to electric motor 191b, such as belt drive and the means is not limited to direct drive as described elsewhere herein and applicant intends to encompass within the language any structure presently existing or developed in the future that performs the same function. Blower wheel 116b takes gas from oven cavity 102 and delivers the gas via gas transfer section 117b to the right top side of oven cavity 102. Although illustrated as a conventional blower motor, blower motor shaft and blower wheel, other gas pumping means such as a compressor may be utilized to re-circulate gas to and from oven cavity 102 and applicant intends to encompass within the language any structure presently existing or developed in the future that performs the same function. Top right gas transfer section 117b is in fluid connection with a lower right gas transfer section 118b via a right vertical gas transfer section 119b. Right vertical transfer section 119b is bounded by right side wall 106 and a right microwave waveguide section 120b.

Figure 15:
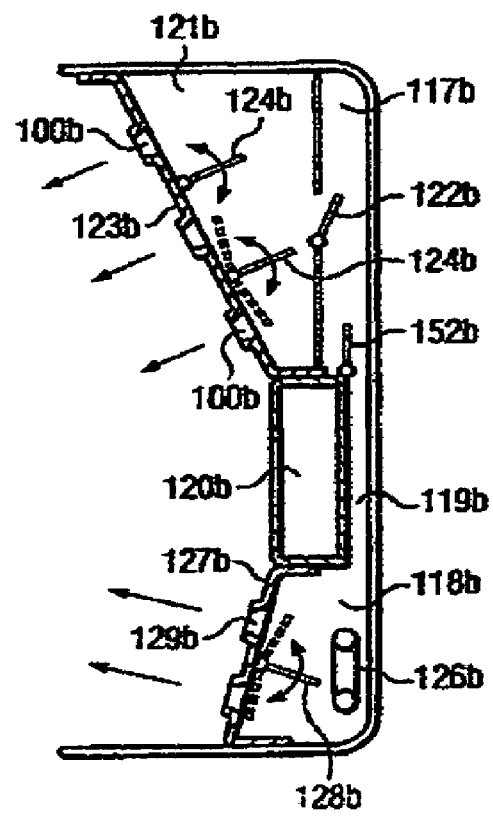
FIG. 15 is a right side section detail of gas flow control

As gas is discharged into top right gas transfer section 117b, a selected portion of said gas is directed into a top right discharge section 121b by a top right deflecting means 122b, shown in the open position in FIG. 15. Thereafter the gas is discharged through a top right slotted or perforated discharge plate 123b into oven cavity 102. Slotted or perforated right discharge plate 123b is used to distribute gas leaving top right gas delivery section 121b through various apertures 100b into oven cavity 102 and onto the right top and side portion of the food product 110. As gas enters top right gas delivery section 121b, said gas may be further deflected via a top right gas deflecting means 124b as shown in FIG. 15. Gas deflecting means 124b is shown as pivotally attached to slotted or perforated discharge plate 123b, although other means for accomplishing said gas deflection may be utilized, and applicant intends to encompass within the language any structure presently existing or developed in the future that performs the same function. For example, the use of normally open, normally closed, or normally partially open and normally partially closed switched plates may be used (wherein said plates slide along the inside of perforated plate 123b to limit the aperture openings 100b of discharge plate 123b. Gas that has not been discharged or deflected into top right gas delivery section 121b by gas deflecting means 122b flows to lower right gas transfer section 118b via vertical transfer section 119b. Pivotally attached to waveguide section 120b is a gas transfer deflection mechanism 152b, shown in the open position, FIG. 15, that operate to limit the amount of gas that is transferred to lower gas transfer section 118b. Again, as with the left side gas transfer system, certain speed cooking operations may call for more gas flow to the lower part of the speed cooking oven, while other operations will call for little or no gas flow to the lower part of the oven for bottom side browning of the food product. In those instances where little or no gas flow is desired upon the bottom surface of the food product, gas transfer deflection means 152b may be closed, or partially closed, in order to allow little or no gas flow to lower gas delivery section 118b.

Gas flow that that is distributed to lower right gas delivery section 118b may be re-heated, if required, by lower right heating means 126b, FIG. 15. After passing over heating elements 126b, which may or may not be present in every oven, depending upon the particular oven requirements, the gas may be further deflected by deflecting means 128b, FIG. 15, shown in the open position. As gas deflecting means 128b is rotated, directional control of the gas flow may be further refined, allowing for gas flow to pass through the upper or lower apertures of lower gas plate 127b at various positions along food product 110 bottom surface. Apertures 100b and 129b are sized for low pressure drop, while providing and maintaining sufficient gas velocities of approximately 2000 ft/min to approximately 6000 ft./minute to properly cook the food product although as with other oven functions, gas flows above 6000 ft/minute and lower than 2000 ft/minute may be utilized as needed. Again, as shown in FIG. 14a, the top apertures are adjusted such that the majority of the gas is supplied from the top right gas discharge section 121b. The resulting imbalance of gas flows between the top right gas discharge section 121b and lower right gas discharge section 118b is desirable because the top flow 130b, FIG. 14a, must aggressively remove moisture produced and escaping from the top surface and top side surface of the food product 110. The imbalance also serves to heat, brown and/or heat and brown the food product 110.

As gas flow 130a is directed toward the center of oven cavity 102 from the left side and gas flow 130b is directed toward the center of oven cavity 102 from the right side, the gas flows meet upon the surface of the food product and turbulently mixes, causing high heat transfer and rapid cooking of the food product. This turbulently mixed gas flow directed at the food product can best be described as glancing, conflicting and colliding gas flow patterns that spatially average the gas flow over the surface area of the food product producing high heat transfer at the food surface, thereby optimizing speed cooking. The gas flow is directed towards the top, the bottom and the sides of the food product from the left and right sides of the oven cavity and the left and right side gas flows conflict, collide and glance off each other at the food product surface before exiting the oven cavity through top gas egress opening. As used herein the term "mixing" refers to the glancing, conflicting and colliding gas flow patterns that meet at and upon the top surface, the bottom surface and the left and right side surfaces of the food product and produce high heat transfer and speed cooking of the food product due to spatial averaging of the gas flow heat transfer. As used herein, the terms "mix", "mixing", "turbulent mix" and "turbulent mixing". The same mixing of gas flow occurs upon the lower surface and lower side surfaces of food product 110 by lower gas flows 132a and 132b also shown in FIG. 14a.

Figure 14B:
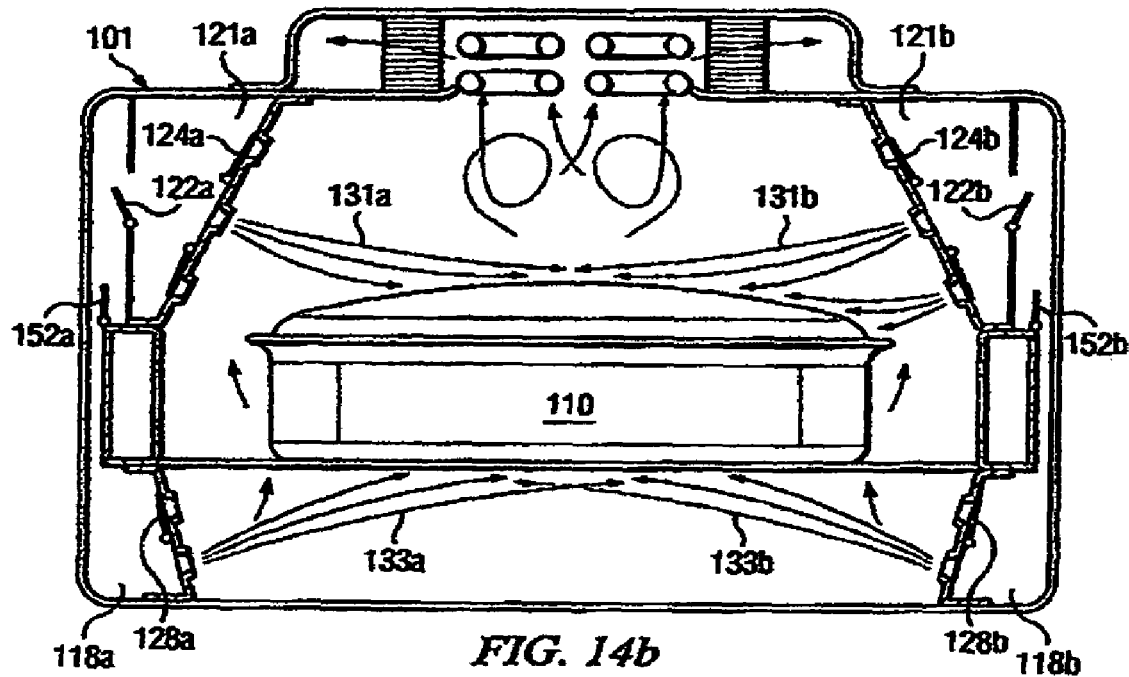
FIG. 14b is a front view of oven gas flow control with less aggressive gas flow

In those instances wherein directional control of the gas flow is desired, gas deflecting means 122a, 122b, 124a, 124b, 128a, 128b and 152a and 152b, FIG. 14b may be rotated such that gas flow is diverted to selected apertures, thereby effecting a different gas flow pattern and gas mixing upon the food product surface. Additionally, in those instances wherein no bottom side gas flow is desired, gas deflecting means 152a, 152b may be closed, thereby allowing for little or no passage of gas flow to the lower portion of the oven cavity. Various other adjustments of gas deflecting means 122a, 122b, 124a, 124b, 128a, 128b, 152a, 152b are possible and applicant intends to encompass within the language any structure presently existing or developed in the future that allows for combinations of open and closed positions by the various gas flow control means. Gas deflecting (flow control) means 122a, 122b, 124a, 124b, 128a, 128b, 152a and 152b may be manually controlled, automatically controlled via controller 134 or some combination of automatic and manual control and applicant intends to encompass within the language any structure presently existing or developed in the future that performs the function described herein concerning adjustment of the gas deflecting means.

The gas flows and flow control within the oven, as well as other functions of cooking appliance are directed by controller 134, FIG. 11. Controller 134 determines, among other things, the velocity of gas flow, which may be constant or varied, or, may be constantly changed throughout the cooking cycle. It may be desired to cook the food product on one velocity throughout the entire cooking cycle, or to vary the gas velocity depending upon conditions such as a predetermined cooking algorithm, or vary the velocity in response to various sensors that may be placed within the oven cavity, oven return air paths or various other positions within the oven. The location and placement of said sensors will be determined by the particular application of the oven. Additionally, other means may be utilized wherein data is transmitted back to controller 134, and thereafter controller 134 adjusts the cooking in an appropriate manner. For example sensors (temperature, humidity, velocity, vision and airborne chemical mixture level sensors) may be utilized to constantly monitor the cooking conditions and adjust the gas flow accordingly within a cooking cycle, and other sensors not described herein may also be utilized. The speed cooking oven may utilize sensors that are not currently commercially utilized (such as laser, non-invasive temperature sensors and other sensors that are currently too expensive to be commercially feasible), and the speed cooking oven is not limited to those discussed herein, as many sensing devices are known and utilized in the cooking art.

The gas flow performance and flow control may also be adjusted as a function of available power. In the event, for example, the heating system in an all electric speed cooking oven is requiring or utilizing a large amount of power (larger than available power levels which may vary according to location and local code and ordinance) it may be desirable for the controller to reduce electrical power to the convection heaters or other electrical components accordingly in order to conserve available power. Indeed, in certain parts of the world where power is limited or capped, for example Japan and Italy, the oven of the present invention can be designed to adjust to these limiting conditions. In a speed cooking gas fired unit, some systems will be powered by electric current, but the electric power requirements will not be as high as required for an all electric oven because the energy required for gas heating and cooking will be provided by the combustion of a hydrocarbon based fuel. In this event a controller may not be required, indeed knobs or dials may be utilized.

Managing the gas flow control and gas flow pattern in a speed cooking oven is important relative to controlling the local convection heat transfer rate at the food product. Many food products cooked in a typical rapid cook oven require that the energy into the food (whether the energy be microwave, impingement gas, halogen light or other energy) be "tailored" (distributed) over the entire cooking cycle. This tailoring or modulation of both the microwave and the convection energy systems is an important feature in achieving a rapidly cooked food product with high food quality. For example, a food product such as a pizza may require as much as 30 minutes to cook in a conventional oven, but can be cooked in as little as 3 minutes in a speed cooking oven. During this three minute cooking cycle, the controller may be programmed with an overall routine of cooking instructions that is broken down into sub-routines or events. As such, in a cooking profile, several different "sub-routines" may be utilized to attain the final rapidly cooked food product. The cook cycle may, for example begin with 20 seconds of high velocity gas flow wherein the gas flow is delivered at 100% velocity and the microwave output is 10% of total microwave capacity. This cycle may then, for example, be followed with 10 seconds of cooking time wherein 10% gas flow is utilized and no microwave power is used. This may then be followed by 1 minute wherein 100% gas flow and 100% microwave power is used, followed by, for example, one minute wherein 50% microwave power is used and 50% gas flow is utilized. These speed cooking ovens therefore require a sophisticated control mechanism that is expensive and can be a source of reliability problems and variable speed blowers have therefore been used in order to control, for example, vertical impingement air flow and as previously described, this approach is expensive because dynamically braking speed variable blower motor speed controllers are required, adding complexity and cost to the appliance. In addition, using air flow rates that vary from low flows to high flows requires "over-design" of oven components such as convection heaters, grease control systems, blowers, blower motor controllers and nozzle plates because the parts must work equally well together at low flow conditions as well as at high flow conditions.

Although the present version with gas flow control may utilize variable speed blower motors and variable speed blower motor controllers in addition to manual or automatically controlled flow control, there is no requirement for their use and the speed cooking oven of the present invention avoids these problems, and the complexity of the variable speed blower motors, by maintaining a substantially constant gas glow rate through the oven cavity, gas transfer and gas delivery sections. FIGS. 14a and 14b show two illustrative gas flow patterns. FIG. 14a illustrates gas flow patterns wherein aggressive gas flow patterns 130a and 130b are top side gas flow and gas flow patterns 132a and 132b are bottom side gas flows. FIG. 14b illustrates less aggressive top side gas flow patterns 131a and 131b and 133a and 133b. One means to achieve this gas flow pattern modification is by use of a gas pumping means, in this illustration, a blower motor, blower wheel combination, utilizing a controller or a multi speed switch that allows for the switching of the blower motor speed in pre-determined fixed increments. Heating of the convection gas is provided by either electric resistance heating means 114a and 114b or by a direct fired (product of combustion mix with oven gas) means. The heater is configured such that it can be operated at a lower heat flux for the convection heating and cooking mode, or at a higher rate for radiant heating and cooking. The radiant heating will also provide convection heat for cooking. The purpose of the radiant feature is to provide additional surface browning.

The speed cooking process utilizing gas flow control produces a high grease generation rate because the amount of grease or liquids that are produced during a rapid cook operation is approximately the same as conventional cooking, but the grease load is produced in $1/5^{th}$ to $1/7^{th}$ and in some instances $1/10^{th}$ the time of conventional cooking times. This results in high grease loading (e.g. ounces/minute) of the gas flow stream which, if not treated, may cause a number of problems including (a) smoke generation, as grease particles impact hot surfaces, (b) soiling of interior gas transfer and delivery surfaces, which may be hidden and difficult to clean, and (c) grease contamination of the food product itself from the re-circulated air flow. Impingement style air flow amplifies this effect by throwing or entraining grease and other liquids that ultimately collect in the grease catch container around the food product. The gas flow of the present invention greatly reduces this effect by not allowing the gas flow to impinge on the liquid coated pan, cooking vessel or food surfaces. In order to control the grease and other liquids produced by the speed cooking process, the first method employed is the particle removal of the grease. Grease in vapor form is much less of an issue because there are no cool walls within the oven for vapor condensation of the grease or liquid. Referring now to FIG. 11 and FIG. 12, left grease extractor 113a and right grease extractor 113b are positioned downstream of left thermal heating means 114a and right thermal means 114b respectively. The gas flow passes over left and right thermal means 114a and 114b before passing through left and right grease extractors 113a and 113b. In order to control grease and other liquid particles, grease extractors 113a and 113b are designed to provide a convoluted gas flow path, 80, FIG. 9b wherein the average flow velocity maintained is in the approximately 2000 ft/minute to approximately 6000 ft/min range, although velocities above the 6000 ft/minute and below the 2000 ft/minute range may be employed. This method will extract a substantial amount of the grease particles with mean diameters greater than approximately 3.0 micrometers. Grease extractors 113a and 113b have a proximal end towards the front of oven cavity 102 and a distal end towards the back wall 194 of oven cavity 102 wherein the distal end is positioned slightly lower than the proximal end to allow grease to flow by means of gravity to the back wall of oven cavity 102 where it is collected within a grease collection means 50, FIG. 9a, or otherwise removed completely from the oven via a tube, channel or other means that allows the liquid grease to collect in a collection device separate and apart from the speed cooking oven. Grease extractors 113a and 113b consist of a series of baffles or troughs 81 FIG. 9b, that rapidly accelerates (change of direction) the flow 80 as the gas flow bends around the flow diverters. Larger or heavier grease particles with the highest inertia cannot be sufficiently accelerated to follow the flow as the flow passes through the diverters. As a result, the grease particles impact the diverter walls. The collection point is the valley or trough, which both prevents re-entrainment of the grease into the air stream and also acts as a grease channel to remove grease from the oven cook cavity. This aerodynamic method of grease removal relies on the pressure drop associated with the turning of the flow through the baffles. This design achieves approximately 90% removal efficiency of 3 micrometer or greater grease particles, while requiring less than approximately 1.5 inches of water column gas flow pressure drop across the grease particle removal sections 113a and 113b. The flow area restriction is designed to accelerate the gas flow prior to the flow diverters and to slow the gas flow after said flow exits the valleys of the trough.

The most efficient utilization of the spent hot gas is by re-circulation of the gas flow through the oven cavity many times during a cooking cycle. During normal speed cooking it may be desirable for one food product to be cooked after another different type of food product (fish followed by pastry) with successive cycles continuing. For example shrimp may be cooked first, followed by a baked product or pastry. Without appropriate filtration, the odors from the shrimp will contaminate the baked product, producing an undesirable taste and odor in the pastry. There exists a need for further air clean-up (in addition to the grease extractors) to further scrub the gas flow of the particles that are not entrained by grease extractors 113a and 113b. In instances wherein further filtration of the gas flow is desired, odor filters may be placed within the oven cavity. FIG. 12 illustrates the use of odor filters 140a and 140b for this purpose. Left side odor filter 140a is attached within top left gas transfer section 117a, downstream of left grease extractor 113a and right odor filter 140b is attached within right gas transfer section 117b downstream of right grease extractor 113b. Odor filters 140a and 140b are attached in a manner that allows for their easy removal for cleaning and replacement. Gas that flows into the left and right gas transfer systems 115a and 115b first passes through odor filters 140a and 140b. The gas flow is therefore further scrubbed after passage through grease extractors 113a and 13b in order to eliminate odors that could interfere with the proper taste of the food product currently being cooked. In some cases it may be beneficial to utilize a second set of odor filters, and these filters may be placed anywhere within the gas flow path of blower wheels 116a and 116b. Odor filers 140a, 140b may be catalytic type elements or other filtration means including, but not limited to activated charcoal, zeolite or ultra violet wavelight light. It is beneficial that the odor filters be comprised of a material, or materials, that effectively scrubs, or cleans the gas flow with a minimal amount of interference with the gas flow velocities. Additionally, it is beneficial that the odor filters be easily removed, easily cleaned and inexpensive for the operator to replace.

The oven of the present invention may also utilize microwave energy to at least partially cook the food product. As seen in FIG. 11, left side microwave launching waveguide 120a is attached within oven cavity 102 to left side wall 105 between top left gas transfer section 117a and lower left gas transfer section 118a. Right side microwave launching waveguide 120b is attached within oven cavity 102 to right side wall 106 between top right gas transfer section 117b and lower right gas transfer section 118b. The microwave waveguides are designed to distribute microwave power uniformly from the back to the front of oven cook cavity 102. As shown in FIG. 8, such a configuration promotes uniform illumination of microwave energy to the right side and to the left side of the cook chamber because the microwave energy from the side walls is additive over the product. The vertical distance above cavity bottom wall 104 of waveguides 120a and 120b is such that, under normal cooking conditions, approximately more than ⅓% of the microwave energy is available below cooking rack 108a, with the balance of microwave energy available above cooking rack 108a.

Metal cooking devices such as cooking pans, cookie sheets and other metal cookware is traditionally used in conventional cooking. Because microwave energy cannot penetrate these metal devices, all of the microwave energy must enter the top and side surfaces of the food product. To overcome the issue that metal pans create, some ovens utilize a top launch microwave system. The theory has been to provide microwave energy through the top surface of the food product, but this application of microwave power applies excessive microwave energy to the top of the product, causing over cooking, producing a tough, rubbery food product. The overcooking problem is especially acute when cooking proteins, such as meat. In order to prevent this microwave overcook condition, one method historically utilized was a reduction of the microwave energy that is available for cooking the food product. The result of limiting the microwave energy to the food product is that the microwave energy is more evenly distributed over the cook cavity, but this reduction in applied microwave energy results in a slower cook process, defeating the desire for a speed cooking oven.

Figure 7:
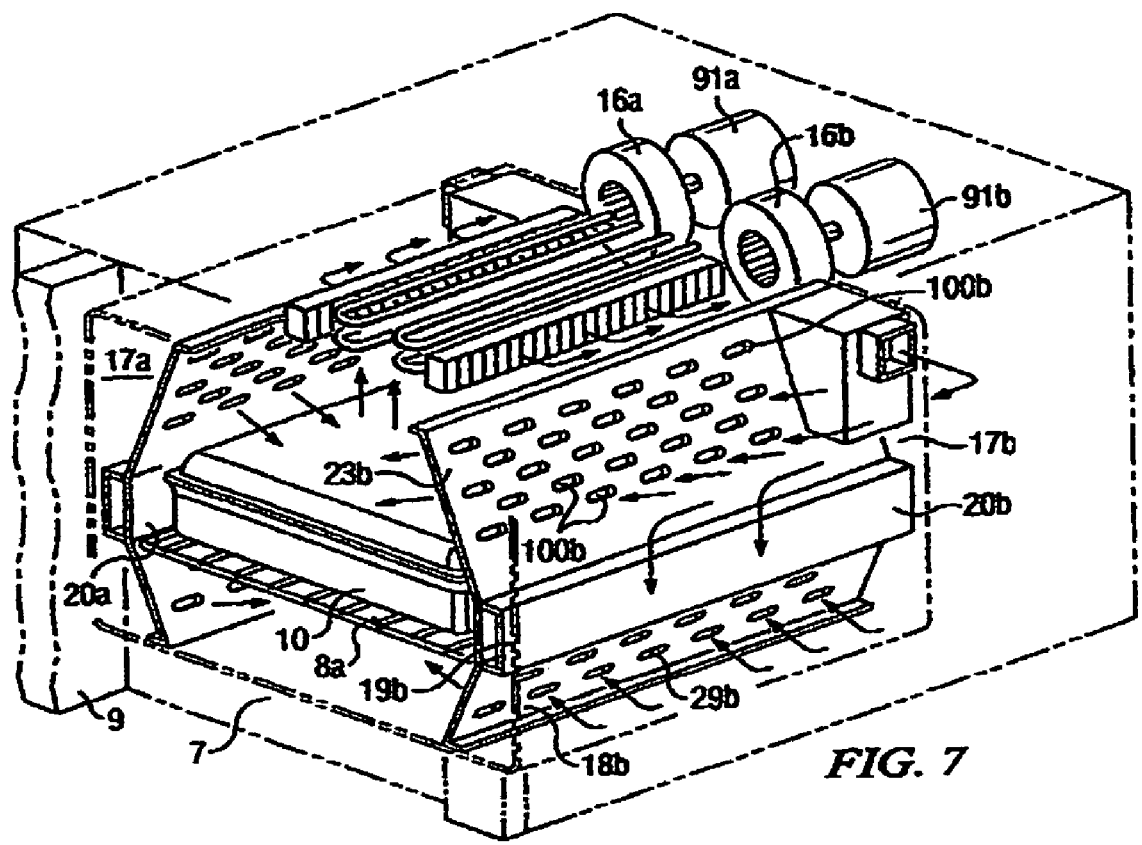
FIG. 7 is an isometric view of the right side and right front of oven
Figure 10:
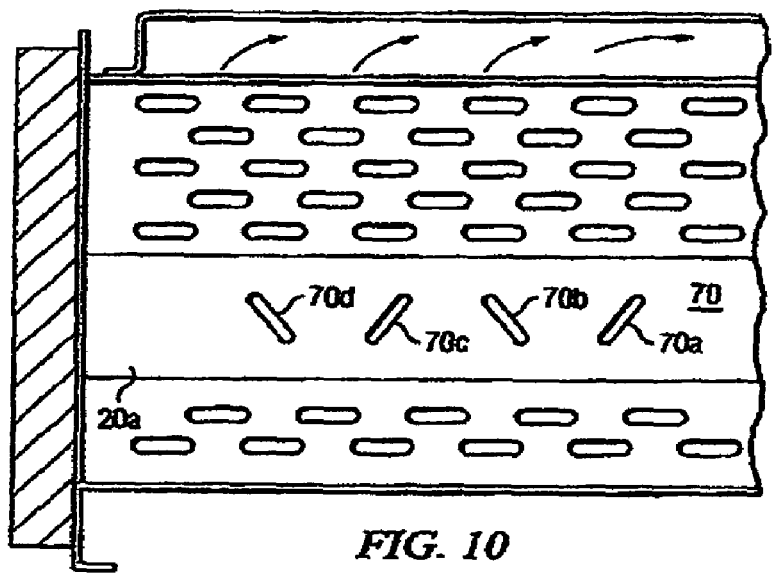
FIG. 10 is a front view of left side oven wall illustrating microwave antenna

Other methods of distributing microwave energy launch microwave energy from below the food product. This is not optimum because microwave energy that is to enter the upper surface of the food product must bounce around within the oven cavity in a random and inefficient manner in order to enter the top side of the food. As shown in FIG. 10 and FIG. 11, microwave energy is broadcast from waveguide 120a into oven cavity 102 via a slotted antenna 170 wherein five apertures (slots) 170a, 170b, 170c, 170d and 170e are spaced along the waveguide. Various configurations for microwave distribution have been utilized with varying results and the invention is not limited to a microwave launcher with five slots. Indeed, the number of slots will be determined by the type of electromagnetic patterns that is desired. Food product 110 is placed within oven cavity 102 a distance of at least 2.4 inches (for optimal cooking uniformity) from left side wall 105 or the same distance from right side wall 106. The 2.45 inch measurement corresponds to one half a microwave wavelength or 2.4 inches (for optimal cooking uniformity) (E field null) for a 2.45 GHz microwave tube (microwave) frequency. This spacing permits the E-field 151a and 151b FIG. 7, to expand and become more uniform prior to coupling with the food product.

The right side microwave system is identical to the left side system and microwave energy is broadcast from right waveguide 120b to oven cavity 102 via a slotted antenna as previously described for the left side. The microwave energy field therefore propagates through the oven cavity in an evenly distributed pattern, coupling with the food product from all directions, and providing an even electromagnetic energy distribution throughout the oven cavity without the need for a mechanical stirrer to propagate the electromagnetic field. Waveguides 120a and 120b are located on the left and right side walls of the oven, and therefore do not interfere with oven cavity spent gas exhaust and because the microwave waveguides are located on the side walls of the oven cavity, they are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip.

As seen in FIG. 11, bottom wall 4 has a smooth, continuous bottom that is easy to clean with no heating elements, air return ducts or microwave launchers within the oven cavity floor. In those instances where air return means, heating elements or microwave launchers protrude through the oven floor, it is very difficult for an operator to clean and maintain the oven in a sanitary condition. In a bottom launch microwave system, the waveguide launcher is generally located within the center portion of the oven cavity bottom wall. As grease, oils and other by-products of the cooking process are released during normal cooking, they drip and splatter onto the microwave launcher. The launcher must be protected and is covered with a microwave transparent material such as quartz and sealed with adhesives or other sealants in an effort to prevent contaminants from entering the launcher, causing pre-mature breakdown of the magnetron. Additionally, some speed cook ovens have located upon the bottom wall a radiant element to assist with bottom side browning. For commercial applications an exposed lower radiant element may result in safety issues as grease builds up around the hot element.

The gas flow control version also utilizes a smooth oven cavity floor that does not allow for the contamination of the microwave system, the gas re-circulating system by grease and other by products of the cooking process that drip or spill from the cooking containers. Gas discharge plates 123a and 123b, FIG. 11, are located in the corners of the oven with the apertures 129a, 129b located above the oven floor. The microwave launching system is affixed between gas transfer sections 117a and 117b on the left side and 118a and 18b on the right side. As such, the bottom of the oven cavity is a continuous, unencumbered surface. Apertures 129a and 129b are positioned above oven bottom wall 104 and cleaning of the oven floor is therefore easily achieved. Additionally, plates 127a and 127b can be manufactured to be removable from lower gas transfer sections 118a and 118b for cleaning or replacement. Radiant elements 103a and 103b, are located within gas transfer sections 118a, and 118b and will therefore not be contaminated by food spills, grease and cooking by-products that splatter and drop from the cooking rack.

Third Version

Another version of the speed cook oven is shown as a multi rack, stand alone commercial cooking appliance, but it is obvious to those skilled in the cooking art that this stand alone speed cooking appliance may exist in many other commercial and residential embodiments (e.g. counter-top oven, wall-oven, single rack oven) because the speed cook oven is scalable up or scalable down. As used herein, the term scalable has the meaning that additional larger or smaller embodiments can be developed for commercial and residential applications. Of course each embodiment may have different size characteristics and require different voltages of electricity—as commercial power supplies are generally different than residential power supplies. This speed cook oven is therefore not limited to commercial uses only, and is equally applicable for residential (home) use. With reference to FIGS. 16-20, a speed cook appliance 201 is schematically shown in the form of a multi rack stand alone commercial counter top cooking appliance. As used herein, the term "commercial" includes, but is not limited to, the commercial food service industry, restaurants, fast food establishments, quick service restaurants, convenience stores (to list a few) and other mass feeding establishments and the term "residential" refers, generally speaking, to residential applications (home use), although the term is not limited to residences only, but refers to non-commercial applications for the speed cooking oven.

Appliance 201 includes an oven cavity 202 generally defined by a top wall 203, a bottom wall 204, left side wall 205 a right side wall 206 a back wall 294 and a front wall 295. Oven cavity 202 also has associated therewith an access opening 207, FIG. 18, through which food items 210 may be placed within oven cavity 102 upon cooking racks 208a, 208b, FIG. 16. Although the multi rack embodiment is shown as a countertop oven with two racks 208a, 208b, supported by side walls 205 and 206, it is obvious to one skilled in the art that the oven may be made with only one rack or made with two racks or more than two racks, and with any number of gas delivery systems, and microwave systems, and is not limited to the two rack design illustrated herein. Although the cooking racks 208a, 208b are shown as supported by side walls 205 and 206, it is obvious to one skilled in the cooking art that rack 208a may be a free-standing cooking rack not supported by the side walls. Cooking appliance 201 has a hinged door 209 FIG. 18 pivotally attached to the oven front for closing the cooking section opening 207 during cooking operation. Hinged door 209 may be swung between an open position wherein the door allows access to oven cavity 202 and a closed position wherein the door covers the opening into oven cavity 202. Although illustrated as a hinged door pivotally attached at the left side of the front of the oven, the door may be hinged on the right side, bottom side or top side.

The speed cooking oven is comprised of two independent gas transfer systems, described herein as a left gas transfer system and a right gas transfer system, wherein left gas transfer system delivers gas to and from the left side of the oven cavity 202, and right gas transfer system delivers gas to and from the right side of the oven cavity 202. Oven cavity 202 also has associated therewith vent tube 271, FIG. 18, which allows for the passage of vent gas from oven cavity 202 to atmosphere. Removably affixed within vent tube 271 is odor filter 272, which provides for the removal of odors caused by the cooking process. Various materials may be utilized to accomplish odor removal and varying efficiencies of said materials may be employed. For example, in some instances it may be desirable for the odor filter to completely (as much as is possible) filter all odors while at other times it may be desirable to provide for a less efficient odor filter 272 in order to allow for the passage of some cooking odors. It has been found that during the cooking process, for example baking bread, the operator has an expectation of smelling bread cooking and it may not be desirable to completely filter all odors.

Figure 18:
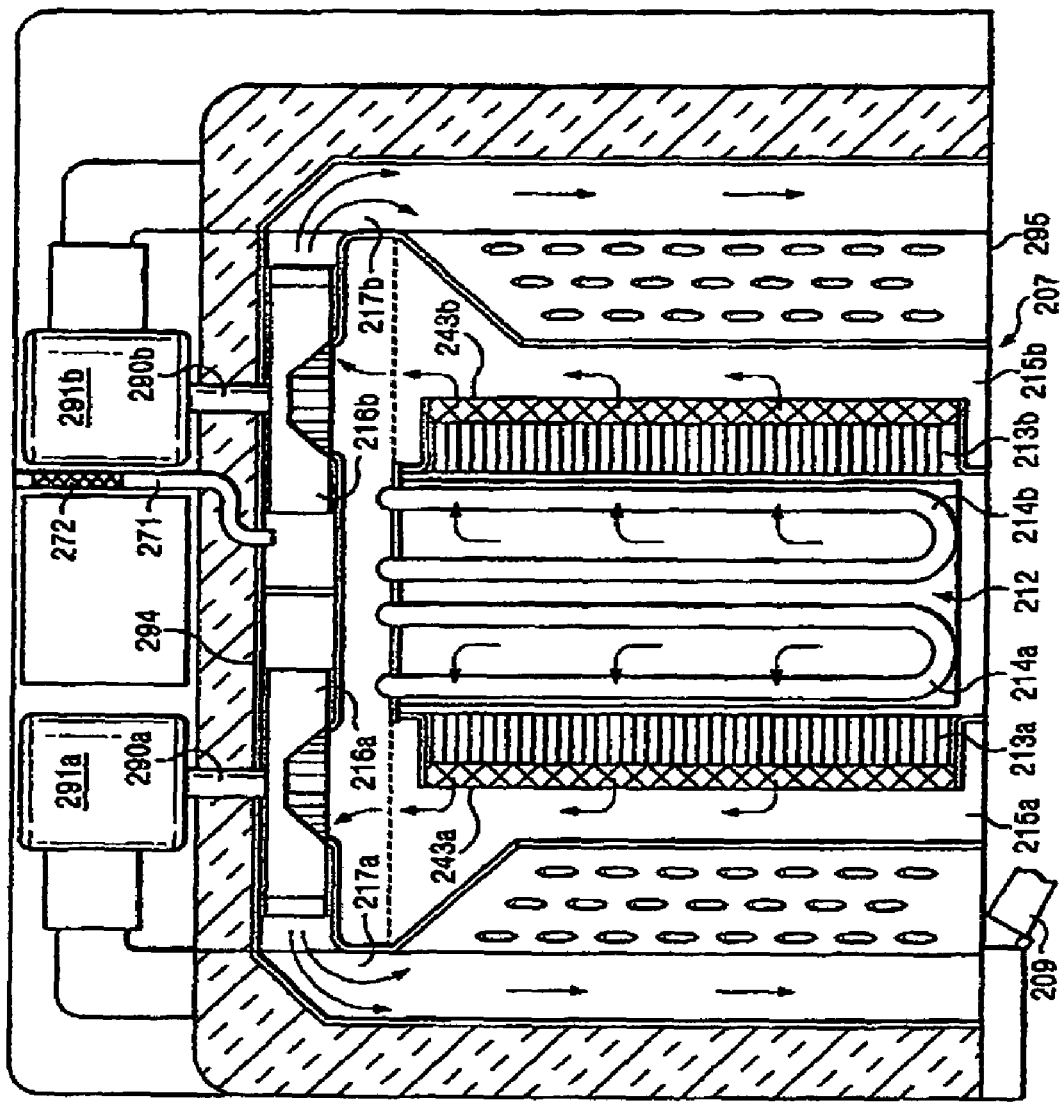
FIG. 18 is a top view of multi rack oven
Figure 19A:
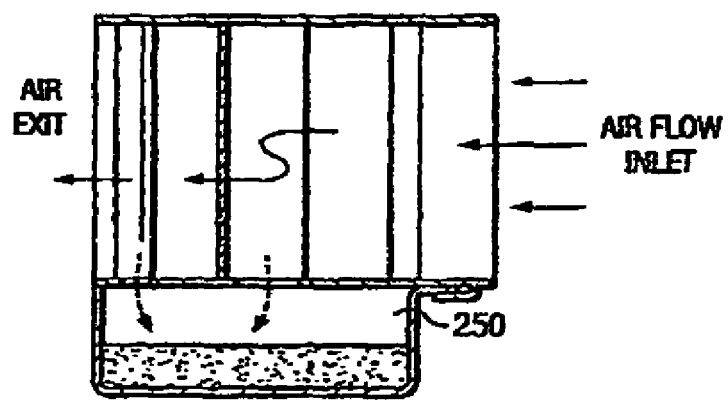
FIG. 19a is a side view of grease extractor
Figure 19B:
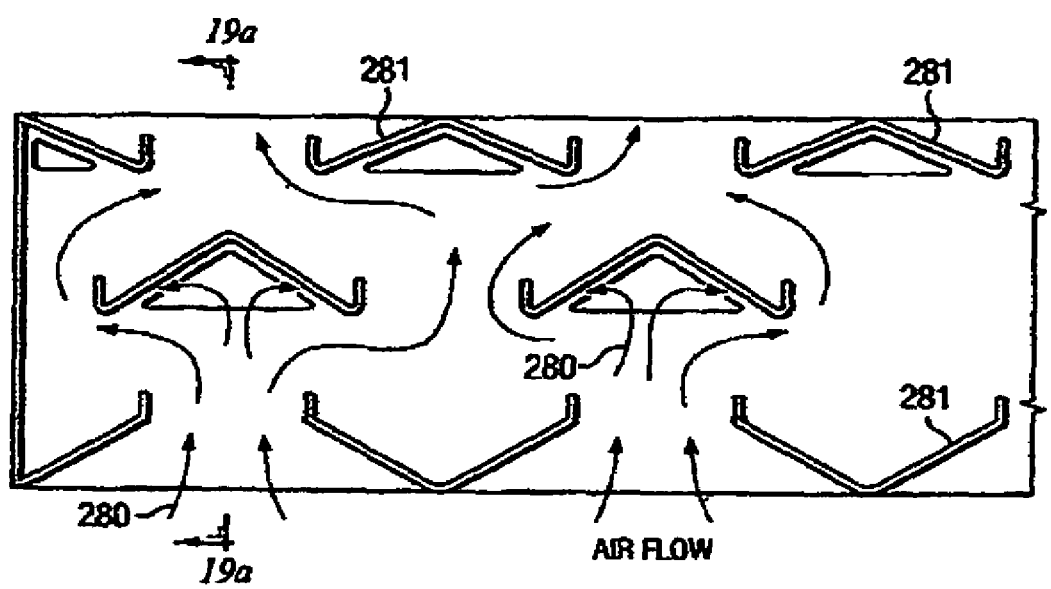
FIG. 19b is a top view of grease extractor
Figure 20:
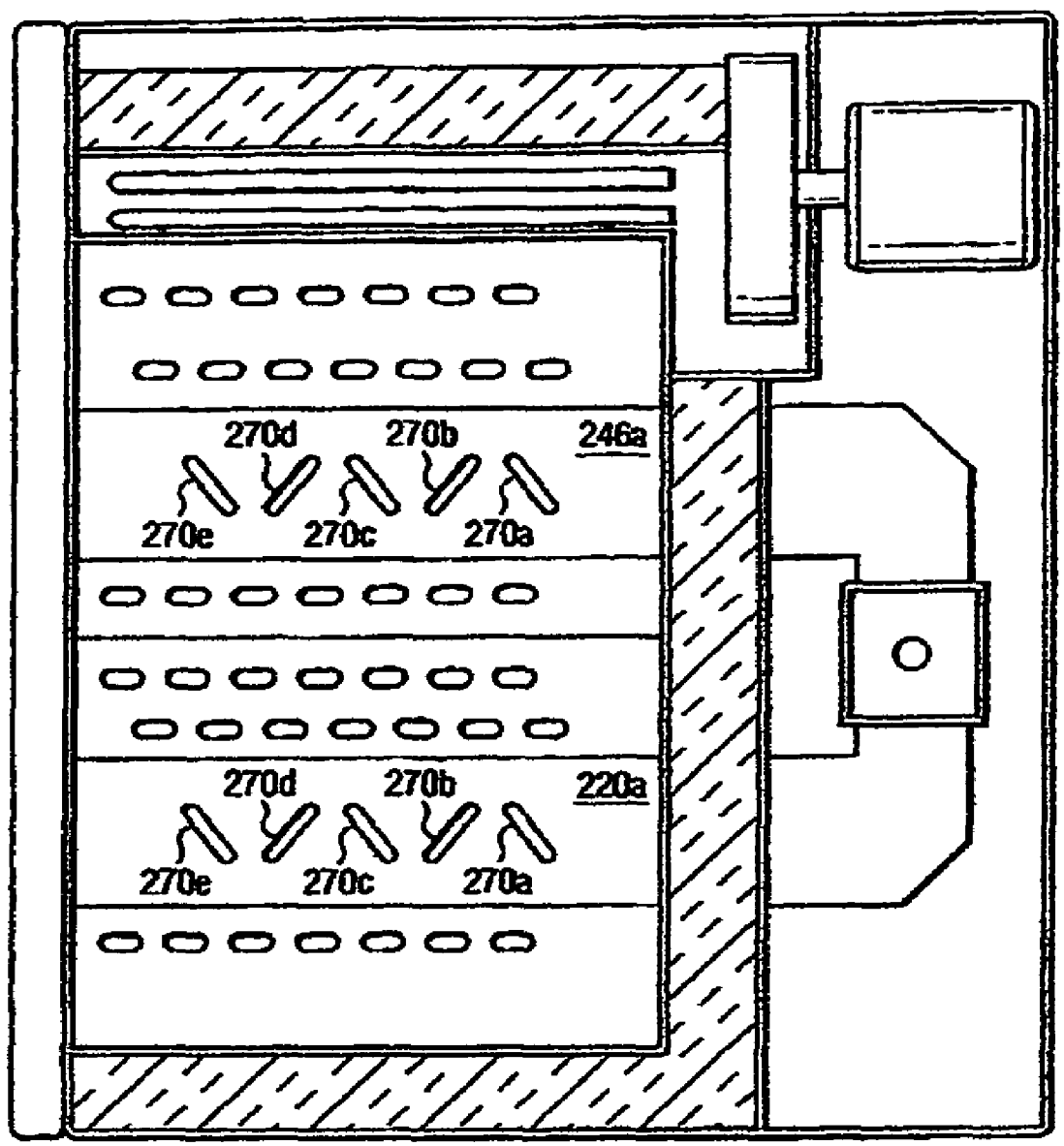
FIG. 20 is a front view of multi rack side section

Referring to FIG. 16, gas is transferred to and from oven cavity 202 via a left gas transfer system, which is comprised of a left gas transfer section 215a, which extends from the front to back of oven top wall 203, along the left side of top wall 203. In fluid connection with left gas transfer section 215a is top gas egress opening 212, which is open to, and in fluid connection with oven cavity 202 through top wall 203. Top gas egress opening 212 is substantially rectangular, although other geometries may be employed, and is centrally located within oven top wall 203 and provides for the passage of gas from oven cavity 202 into left gas transfer section 215a, as gases are removed from oven cavity 202 through top egress gas egress opening 212. Located within left gas transfer section 215a is left grease extractor 213a. As gas is drawn through top gas egress opening 212, the gas passes across left heating means 214a, prior to entry in and through left grease extractor 213a. Heating means 214a may include direct fired thermal energy, indirect fired thermal energy, propane, natural gas, electric resistance heating elements, and other thermal means; and applicant intends to encompass within the language any structure presently existing or developed in the future that performs the same function. After the gas is drawn across heating means 214a and through left grease extractor 213a, it is then drawn through left odor filter 240a and into left gas transfer section 215a. Alternate locations for left odor filter 240a can be utilized within the gas flow path and the location of the left odor filter adjacent to left grease extractor 213a is not required. In fluid connection with, and located within left gas transfer section 215a is a left gas accelerator, illustrated as left blower wheel 216a. Other devices may be utilized to accelerate the gas flow such as a compressor, and applicant intends to encompass within the language any structure presently existing or developed in the future that performs the same function as 216a, 290a, 291a and 216b, 290b and 291b to be discussed further herein. Connected to left blower wheel 216a is blower motor shaft 290a, which is direct drive with electric motor 291a. Other means may be employed for coupling blower wheel 216a to electric motor 291a, such as belt drive and the means is not limited to direct drive. Blower wheel 216a takes gas from oven cavity 202 and delivers the gas via gas transfer section 217a to the left top side of oven cavity 202. Top left gas transfer section 217a, FIG. 18, is in fluid connection with a center left gas transfer section 243a via a left vertical gas transfer section 242a. Left top vertical transfer section 242a is bounded by left side wall 205 and a top left microwave waveguide section 246a. As can be seen in FIG. 16, as gas is pumped into top left gas transfer section 217a, the gas is discharged through a top left discharge plate 223a into oven cavity 202 via apertures 200a and onto the left top and side portion of food product 210 on top rack 208b. Apertures 200a may be slotted, regularly formed or irregularly formed apertures, and are illustrated herein as nozzles 200a, 270a, 280a and 229a, and applicant intends to encompass within the language any structure presently existing or developed in the future that performs the same function as 200a, 229a, 270a 280a and 200b and 229b, 270b, and 280b, discussed further herein. Gas that has not been discharged through top left gas discharge plate 223a flows to center left gas transfer section 243a via vertical transfer section 242a where it may be delivered to the lower portion of the food product 210b located upon top cooking rack 208b via apertures 270a and also delivered to the upper surface of a food product 210a located upon cooking rack 208a via apertures 280a. Remaining gas that has not been delivered through upper gas delivery section 217a or the center delivery section 243a flows to a lower left gas transfer section 218a via gas section 242c, FIG. 16, and may be re-heated, if desired, by a lower left heating means 203a, shown in FIG. 16 before said gas passes through slotted or perforated lower left gas discharge plate 227a via apertures 229a, for discharge onto the left bottom and left bottom side portions of food product 210a upon lower cooking rack 208a. Lower left heating means 203a may be present in some embodiments and not present in others depending upon the particular requirements for the speed cook oven. Apertures 200a, 270a, 280a and 229a are sized for a low pressure drop, while providing and maintaining sufficient gas velocities in the range of approximately 2000 ft/minute to approximately 6000 ft/minute properly cook the food product as described herein although velocities above 6000 ft/minute or below 2000 ft/minute may also be utilized if required. As shown in FIG. 16, apertures 200a and 280a are sized such that the majority of the gas is supplied from the top left gas discharge plate 223a and the downward directed portion of center discharge plate 290a. The resulting imbalance of gas flows between the top left gas discharge plate 223a and center discharge plate 290a as compared to the upward directed discharge plate 227a and the upward directed portion of discharge plate 290a is desirable because the top flows to food products 210a and 210b must aggressively remove moisture produced and escaping from the top and top side surface of the food products 210a and 210b. The imbalance also serves to heat, brown and/or heat and brown the food products 210a and 210b.

Referring again to FIG. 18, gas is transferred to and from oven cavity 202 via a right gas transfer system, which is comprised of a right gas transfer section 215b, which extends from the front to back of oven top wall 203, along the right side of top wall 203. In fluid connection with right gas transfer section 215b is top gas egress opening 212, which is open to, and in fluid connection with oven cavity 202 through top wall 203. Top gas egress opening 212 is substantially rectangular, although other geometries may be employed, and is centrally located within oven top wall 203 and provides for the passage of gas from oven cavity 202 into right gas transfer section 215b, as gases are removed from oven cavity 202 through top egress gas egress opening 212. Located within right gas transfer section 215b is right grease extractor 213b. As gas is drawn through top gas egress opening 212, the gas passes across right heating means 214b, prior to entry in and through right grease extractor 213b. Heating means 214b may include direct fired thermal energy, indirect fired thermal energy, propane, natural gas, electric resistance heating elements, and other thermal means; and applicant intends to encompass within the language any structure presently existing or developed in the future that performs the same function. After the gas is drawn across heating means 214b and through right grease extractor 213b, it is then drawn through right odor filter 240b and into right gas transfer section 215b. Alternate locations for right odor filter 240b can be utilized within the gas flow path and the location of the right odor filter adjacent to right grease extractor 213b is not required. In fluid connection with, and located within right gas transfer section 215b is a right gas accelerator, illustrated as right blower wheel 216b. Other devices may be utilized to accelerate the gas flow such as a compressor, and applicant intends to encompass within the language any structure presently existing or developed in the future that performs the same function as 216b, 290b, 291b and 216b. Connected to right blower wheel 216b is blower motor shaft 290b, which is direct drive with electric motor 291b. Other means may be employed for coupling blower wheel 216b to electric motor 291b, such as belt drive and the means is not limited to direct drive. Blower wheel 216b takes gas from oven cavity 202 and delivers the gas via gas transfer section 217b to the right top side of oven cavity 202. Top right gas transfer section 217b, FIG. 16, is in fluid connection with a center right gas transfer section 243b via a right vertical gas transfer section 242b. Right top vertical transfer section 242b is bounded by right side wall 205 and a top right microwave waveguide section 246b. As can be seen in FIG. 16, as gas is pumped into top right gas transfer section 217b, the gas is discharged through a top right discharge plate 223b into oven cavity 202 via apertures 200b and onto the right top and side portion of food product 210b on top rack 208b. Apertures 200b may be slotted, regularly formed or irregularly formed apertures, and are illustrated herein as nozzles 200b, 270b, 280b and 229b, and applicant intends to encompass within the language any structure presently existing or developed in the future that performs the same function as 200b, 229b, 270b 280b. Gas that has not been discharged through top right gas discharge plate 223b flows to center right gas transfer section 243b via vertical transfer section 242b where it may be delivered to the lower portion of the food product 210b located upon top cooking rack 208b via apertures 270b and also delivered to the upper surface of a food product 210a located upon cooking rack 208a via apertures 280b. Remaining gas that has not been delivered through upper gas delivery section 217b or the center delivery section 243b flows to a lower right gas transfer section 218b via gas section 242d, FIG. 16, and may be re-heated, if desired, by a lower right heating means 203b, shown in FIG. 16 before said gas passes through slotted or perforated lower right gas discharge plate

227b via apertures 229b, for discharge onto the right bottom and right bottom side portions of food product 210a upon lower cooking rack 208a. Lower right heating means 203b may be present in some embodiments and not present in others depending upon the particular requirements for the speed cook oven. Apertures 200b, 270b, 280b and 229b are sized for a low pressure drop, while providing and maintaining sufficient gas velocities in the range of approximately 2000 ft/minute to approximately 6000 ft/minute properly cook the food product as described herein although velocities above 6000 ft/minute or below 2000 ft/minute may also be utilized if required. As shown in FIG. 16, apertures 200b and 280b are sized such that the majority of the gas is supplied from the top right gas discharge plate 223b and the downward directed portion of center discharge plate 290b. The resulting imbalance of gas flows between the top right gas discharge plate 223b and center discharge plate 290b as compared to the upward directed discharge plate 227b and the upward directed portion of discharge plate 290b is desirable because the top flows to food products 210a and 210b must aggressively remove moisture produced and escaping from the top and top side surface of the food products 210a and 210b. The imbalance also serves to heat, brown and/or heat and brown the food products 210a and 210b.

The left and right gas supply systems, although independently described herein, are the same configuration and function to uniformly circulate hot gas flow across the top and top sides and bottom and bottom sides of the food product, and return the gas to the heating mechanism for re-delivery to the cooking cavity.

As described, the gas flow is delivered via the six gas transfer sections 217a, 217b, 243a, 243b, 218a, and 218b, wherein sections 217a, 217b, 218a and 218b are located in the top and bottom corners of oven cavity 202 and sections 243a and 243b are located between waveguides 246a and 220a and 246b and 220b respectively. Gas flow transfer sections 217a, 217b, 243a, 243b, 218a and 218b extend from the back wall 294 of the oven cavity to the front wall 295 of the oven cavity, although it is not required that the gas flow transfer sections extend the entire depth of the oven cavity. Gas transfer section 217a is located in the top left corner of oven cavity 202 where top wall 203 intersects oven cavity side wall 205; gas transfer section 217b in the top right corner of oven cavity 202 where top wall 203 intersects right side wall 206; gas transfer section 218a in the lower left corner of oven cavity 202 where bottom wall 204 intersects left side wall 205; and gas transfer section 218b in located the lower right corner of the oven cavity where bottom wall 204 intersects right side wall 206. Gas transfer sections 243a is located between waveguides 246a and 220a and gas transfer section 243b is located between waveguide sections 246b and 220b. The gas transfer sections extend along the inside of oven cavity 202 from the back wall 294 of the oven cavity to the front wall 295 of the oven cavity. Each of the gas transfer sections are sized and configured to deliver the appropriate gas flow for the particular oven utilized. For example, in a smaller oven, the gas delivery sections, indeed the entire oven, may be sized smaller in proportion to the smaller footprint of the particular requirements, and a larger oven will have proportionally larger gas delivery sections. As seen in FIG. 16, the left side and the right side gas flows converge on the food products 210a and 210b thereby creating an aggressive flow field on the food product surface that strips away the moisture boundary layer. This turbulently mixed gas flow directed at the food product can best be described as glancing, conflicting and colliding gas flow patterns that spatially average the gas flow over the surface area of the food product producing high heat transfer and moisture removal rates at the food surface, thereby optimizing speed cooking. The gas flow is directed towards the top, the bottom and the sides of the food product from the left and right sides of the oven cavity and the left and right side gas flows conflict, collide and glance off each other at the food product surface before exiting the oven cavity through top gas egress opening. As used herein, the terms "mix", "mixing", "turbulent mix" and "turbulent mixing". The gas flow is directed towards the top, the bottom and the sides of the food product from the left and right sides of the oven cavity and the left and right side gas flows conflict, collide and glance off each other at the food product surface before exiting the oven cavity through top gas egress opening 212. The oven of the present invention does not require smooth gas flow, laminar gas flow or air wrap gas flow. The glancing, conflicting and colliding gas flows patterns are created within the oven cavity and, when appropriately directed and deflected, produces a high quality cooked food product very quickly. Enhancing the highly agitated, glancing, conflicting, and colliding gas flow of the present invention is the general upward flow path the gas will follow, as shown in FIG. 16, through top gas egress opening 212, as the gas exits the top of oven cavity 202. This upward gas flow draws also the gas from lower gas discharge sections 218a and 218b and center gas discharge sections 243a and 243b, thereby scrubbing the bottom of the food product, pot, pan or other cooking vessel, around the sides of said vessel and further enhances the heat transfer as well as drawing the gas that scrubs the upper surface up towards the oven cavity top wall.

Returning to FIG. 16, top gas discharge plates 223a and 223b are positioned within oven cavity 202 such that the gas flow from top gas transfer section 217a mixes with the gas flow from top gas transfer section 217b upon the top and top side surfaces of food product 210b and strikes the food product at an angle that is between zero degrees and ninety degrees as referenced from the horizontal top wall (where zero degrees is parallel to the horizontal top wall).

Lower gas discharge plates 227a and 227b are positioned within oven cavity 202 such that the gas flow from lower gas transfer section 218a mixes with the gas flow from lower gas transfer section 218b upon the lower and lower side surface of food product 210a and strikes the food product at an angle that is between zero degrees and ninety degrees as referenced from the horizontal top wall.

Center gas discharge plates 295a and 295b are positioned within oven cavity 202 such that the gas flow from the upward pointing section of gas discharge plate 295a mixes with the gas flow from the upward pointing section of gas discharge plate 295b upon the lower surface and lower side surface of food product 210b upon upper cooking rack 208b and strikes the food product at an angle that is between zero degrees and ninety degrees as referenced from the horizontal bottom wall, although, just as with the top and bottom gas delivery sections, center delivery sections 295a and 295b can be set at an angle that can be adjusted from zero degrees to ninety degrees as referenced from the horizontal bottom wall. The downward pointing section of gas discharge plate 295a mixes with the gas flow from the downward pointing section of gas discharge plate 295b upon the upper surface and upper side surface of food product 210a upon lower cooking rack 208a and strikes the food product at an angle that is between zero degrees and ninety degrees as referenced from the horizontal bottom wall, although, just as with the top and bottom gas delivery sections, center delivery sections 295a and 295b can be set at an angle that can be set from approximately zero degrees to approximately degrees from the horizontal bottom wall and adjustments may be made either at the site of manufacture or, alternatively in some instances, adjusted by the user as desired. As described herein, all gas delivery section for all versions or embodiments may be made adjustable and applicant intends to encompass within the language any structure presently existing or developed in the future that performs the same function as adjustment to the angles of gas delivery sections and gas delivery plates.

The number and placement of the apertures 200a, 200b, 270a, 270b 229a and 200b, and 280a and 280b will vary according to the particular oven that is required. As described herein, this invention is "scalable" and as used herein the term scalable has the meaning that the technology will provide for a platform of products, not merely one particular size or one particular product. If, for example, a speed cooking baking oven were desired (as opposed to a general purpose speed cooking oven which cooks proteins, baked products, etc.) the apertures may be larger, but fewer in number. This would allow for a more gentle gas flow field across the food product, and therefore more delicate baking of the food product. If a browning oven were desired, the apertures may be more numerous and smaller in diameter. Additionally, the operator may desire flexibility of cooking and in this circumstance, gas discharge plates 223a, 223b, 295a, 295b and 227a and 227b may be fabricated in a manner that allows for change-out of the plates. As used herein the term "aperture" refers to irregular slots, holes or nozzles, regularly formed slots, irregularly formed holes or nozzles or a mixture of regularly formed and irregularly formed slots, holes or nozzles.

The gas delivery system as illustrated in FIG. 16, as described herein, produces aggressive glancing, conflicting and conflicting gas flow patterns 330a and 330b, FIG. 16, wherein gas flow is directed onto the top surfaces of the food products 210a and 210b. An aggressive top glancing, conflicting and colliding gas flow pattern 330a is directed towards the left top of food product 210a and 210b and also interacts with the left top portion and left top side portion of food products 210a and 210b. A similar right top glancing, conflicting and colliding gas flow pattern 330b interacts with the top portion and top right side portion of food products 210a and 210b.

As seen in FIG. 16, gas flow is also directed upwardly from the center gas transfer sections 243a and 243b and the lower gas transfer sections 218a and 218b. As such, aggressive glancing, conflicting and colliding gas flow patterns 331a and 331b interact with the lower left and right portions of the food products 210a and 210b. This cooking profile creates high heat transfer capability by using the irregular surface of the food product, as well as the interference of flow fields to minimize boundary layer growth. The angle of the gas flow velocity vector leaving the top left and top right discharge plates 223a and 223b respectively, the center discharge plates 295a and 295b (both upward and downward gas flow), and the gas flow from the bottom left and bottom right discharge plates 227a and 227b respectively, is between zero degrees and ninety degrees from horizontal bottom wall 204. After the aggressive glancing conflicting and conflicting gas flow patterns 330a and 330b, 331a and 331b contact or strike the food product they are exhausted through top egress section 212 and cycle back through the oven as described herein.

Figure 1:
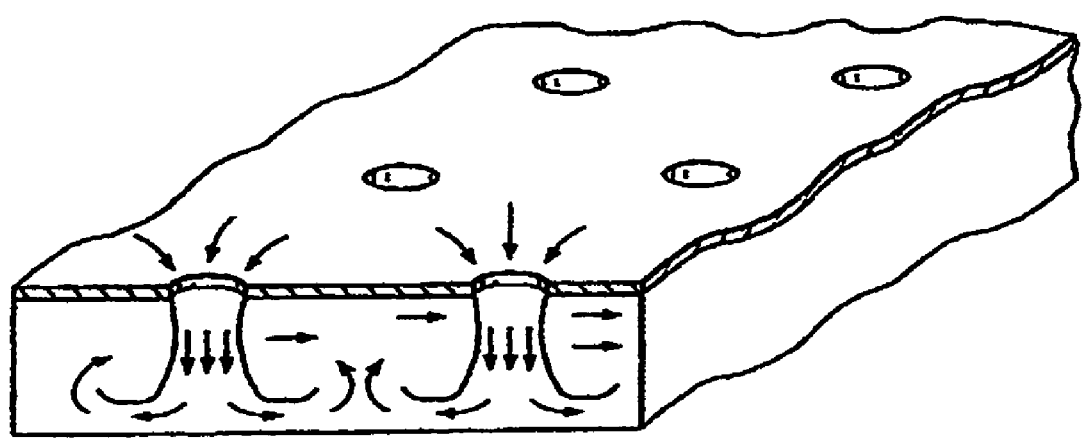
FIG. 1 is a cross sectional view of Impingement style heat transfer

The gas flows within the multi rack oven, as well as other functions of cooking appliance are directed by controller 234, FIG. 1. Controller 234 determines, among other things, the velocity of gas flow, which may be constant or varied, or, may be constantly changed throughout the cooking cycle. It may be desired to cook the food product on one velocity throughout the entire cooking cycle, or to vary the gas velocity depending upon conditions such as a pre-determined cooking algorithm, or vary the velocity in response to various sensors that may be placed within the oven cavity, oven return air paths or various other positions within the oven. The location and placement of said sensors will be determined by the particular application of the oven. Additionally, other means may be utilized wherein data is transmitted back to controller 234, and thereafter controller 234 adjusts the cooking in an appropriate manner. For example sensors (temperature, humidity, velocity, vision and airborne chemical mixture level sensors) may be utilized to constantly monitor the cooking conditions and adjust the gas flow accordingly within a cooking cycle, and other sensors not described herein may also be utilized. The speed cooking oven may utilize sensors that are not currently commercially utilized (such as laser, non-invasive temperature sensors and other sensors that are currently too expensive to be commercially feasible), and the speed cooking oven is not limited to those discussed herein, as many sensing devices are known and utilized in the cooking art.

The gas flow performance may also be adjusted as a function of available power. In the event, for example, the heating system in an all electric speed cooking oven is requiring or utilizing a large amount of power (larger than available power levels which may vary according to location and local code and ordinance) it may be desirable for the controller to reduce electrical power to the convection heaters or other electrical components accordingly in order to conserve available power. Indeed, in certain parts of the world where power is limited or capped, for example Japan and Italy, the oven of the present invention can be designed to adjust to these limiting conditions. In a speed cooking gas fired unit, some systems will be powered by electric current, but the electric power requirements will not be as high as required for an all electric oven because the energy required for gas heating and cooking will be provided by the combustion of a hydrocarbon based fuel. In this event a controller may not be required, indeed knobs or dials may be utilized.

Managing the gas flow pattern in a speed cooking oven is important relative to controlling the local convection heat transfer rate at the food product. Many food products cooked in a typical rapid cook oven require that the energy into the food (whether the energy be microwave, impingement gas, halogen light or other energy) be "tailored" (distributed) over the entire cooking cycle. This tailoring or modulation of both the microwave and the convection energy systems is an important feature in achieving a rapidly cooked food product with high food quality. For example, a food product such as a pizza may require as much as 30 minutes to cook in a conventional oven, but can be cooked in as little as 3 minutes in a speed cooking oven. During this three minute cooking cycle, the controller may be programmed with an overall routine of cooking instructions that is broken down into sub-routines or events. As such, in a cooking profile, several different "sub-routines" may be utilized to attain the final rapidly cooked food product. The cook cycle may, for example begin with 20 seconds of high velocity gas flow wherein the gas flow is delivered at 100% velocity and the microwave output is 10% of total microwave capacity. This cycle may then, for example, be followed with 10 seconds of cooking time wherein 10% gas flow is utilized and no microwave power is used. This may then be followed by 1 minute wherein 100% gas flow and 100% microwave power is used, followed by, for example, one minute wherein 50% microwave power is used and 50% gas flow is utilized. These speed cooking ovens therefore require a sophisticated control mechanism that is expensive and can be a source of reliability problems and variable speed blowers have therefore been used in order to control, for example, vertical impingement air flow and as previously described, this approach is expensive because dynamically braking speed variable blower motor speed controllers are required, adding complexity and cost to the appliance. In addition, using air flow rates that vary from low flows to high flows requires "over-design" of oven components such as convection heaters, grease control systems, blowers, blower motor controllers and nozzle plates because the parts must work equally well together at low flow conditions as well as at high flow conditions.

Although the present invention may utilize variable speed blower motors and variable speed blower motor controllers, there is no requirement for their use and the speed cooking oven of the present invention avoids these problems, and the complexity of the variable speed blower motors, by maintaining a substantially constant gas glow rate through the oven cavity, gas transfer and gas delivery sections. One means to achieve this gas flow pattern modification is by use of a gas pumping means, in this illustration, a blower motor, blower wheel combination, utilizing a controller or a multi speed switch that allows for the switching of the blower motor speed in pre-determined fixed increments. Heating of the convection gas is provided by either electric resistance heating means 214a and 214b or by a direct fired (product of combustion mix with oven gas) means. The heater is configured such that it can be operated at a lower heat flux for the convection heating and cooking mode, or at a higher rate for radiant heating and cooking. The radiant heating will also provide convection heat for cooking. The purpose of the radiant feature is to provide additional surface browning.

The speed cooking process produces a high grease generation rate because the amount of grease or liquids that are produced during a rapid cook operation is approximately the same as conventional cooking, but the grease load is produced in $\frac{1}{5}^{th}$ to $\frac{1}{7}^{th}$ and in some instances $\frac{1}{10}^{th}$ the time of conventional cooking times. This results in high grease loading (e.g. ounces/minute) of the gas flow stream which, if not treated, may cause a number of problems including (a) smoke generation, as grease particles impact hot surfaces, (b) soiling of interior gas transfer and delivery surfaces, which may be hidden and difficult to clean, and (c) grease contamination of the food product itself from the re-circulated air flow. Impingement style air flow amplifies this effect by throwing or entraining grease and other liquids that ultimately collect in the grease catch container around the food product. The gas flow of the present invention greatly reduces this effect by not allowing the gas flow to impinge on the liquid coated pan, cooking vessel or food surfaces. In order to control the grease and other liquids produced by the speed cooking process, the first method employed is the particle removal of the grease. Grease in vapor form is much less of an issue because there are no cool walls within the oven for vapor condensation of the grease or liquid. Referring now to FIG. 16 and FIG. 18, left grease extractor 213a and right grease extractor 213b are positioned downstream of left thermal heating means 214a and right thermal means 214b respectively. The gas flow passes over left and right thermal means 214a and 214b before passing through left and right grease extractors 213a and 213b. In order to control grease and other liquid particles, grease extractors 213a and 213b are designed, FIG. 19b, to provide a convoluted gas flow path, 280 wherein the average flow velocity maintained is in the approximately 2000 ft/minute to approximately 6000 ft/min range although velocities above 6000 ft/minute may be utilized and velocities below 2000 ft/minute may also be used. This method will extract a substantial amount of the grease particles with mean diameters greater than approximately 3.0 micrometers. Grease extractors 213a and 213b have a proximal end towards the front of oven cavity 202 and a distal end towards the back wall of oven cavity 202 wherein the distal end is positioned slightly lower than the proximal end to allow grease to flow by means of gravity to the back wall of oven cavity 202 where it is collected within a grease collection means 250, FIG. 19a, or otherwise removed completely from the oven via a tube, channel or other means that allows the liquid grease to collect in a collection device separate and apart from the speed cooking oven. Grease extractors 213a and 13b consist of a series of baffles or troughs 281 that rapidly accelerates (change of direction) the flow 280 as the gas flow bends around the flow diverters. Larger or heavier grease particles with the highest inertia cannot be sufficiently accelerated to follow the flow as the flow passes through the diverters. As a result, the grease particles impact the diverter walls. The collection point is the valley or trough, which both prevents re-entrainment of the grease into the air stream and also acts as a grease channel to remove grease from the oven cook cavity. This aerodynamic method of grease removal relies on the pressure drop associated with the turning of the flow through the baffles. This design achieves approximately 90% removal efficiency of 3 micrometer or greater grease particles, while requiring less than approximately 1.5 inches of water column gas flow pressure drop across the grease particle removal sections 213a and 213b. The flow area restriction is designed to accelerate the gas flow prior to the flow diverters and to slow the gas flow after said flow exits the valleys of the trough.

The most efficient utilization of the spent hot gas is by re-circulation of the gas flow through the oven cavity many times during a cooking cycle. During normal speed cooking it may be desirable for one food product to be cooked after another different type of food product (fish followed by pastry) with successive cycles continuing. For example shrimp may be cooked first, followed by a baked product or pastry. Without appropriate filtration, the odors from the shrimp will contaminate the baked product, producing an undesirable taste and odor in the pastry. There exists a need for further air clean-up (in addition to the grease extractors) to further scrub the gas flow of the particles that are not entrained by grease extractors 213a and 213b. In instances wherein further filtration of the gas flow is desired, odor filters may be placed within the oven cavity. FIG. 16 illustrates the use of odor filters 240a and 240b for this purpose. Left side odor filter 240a is attached within top left gas transfer section 217a, downstream of left grease extractor 213a and right odor filter 240b is attached within right gas transfer section 217b downstream of right grease extractor 213b. Odor filters 240a and 240b are attached in a manner that allows for their easy removal for cleaning and replacement. Gas that flows into the left and right gas transfer systems 215a and 215b first passes through odor filters 240a and 240b. The gas flow is therefore further scrubbed after passage through grease extractors 213a and 213b in order to eliminate odors that could interfere with the proper taste of the food product currently being cooked. In some cases it may be beneficial to utilize a second set of odor filters, and these filters may be placed anywhere within the gas flow path. Odor filers 240a and 240b may be catalytic type elements or other filtration means including, but not limited to activated charcoal, zeolite or ultra violet wavelight light. It is beneficial that the odor filters be comprised of a material, or materials, that effectively scrubs, or cleans the gas flow with a minimal amount of interference with the gas flow velocities. Additionally, it is beneficial that the odor filters be easily removed, easily cleaned and inexpensive for the operator to replace.

The oven of the present invention may also utilize microwave energy to at least partially cook the food product. As seen in FIG. 16, left side microwave launching waveguides 220a and 242a are attached within oven cavity 202 to left side wall 205 between top left gas transfer section 217a, center gas section 243a and lower left gas transfer section 218a. Right side microwave launching waveguides 220b and 242b are attached within oven cavity 202 to right side wall 206 between top right gas transfer section 217b, center gas section 243b and lower right gas transfer section 218b. The microwave waveguides are designed to distribute microwave power uniformly from the back to the front of oven cook cavity 202. Such a configuration promotes uniform illumination of microwave energy to the right side and the left side of the cook chamber because the microwave energy from the side walls is additive over the product. The vertical distance above cavity bottom wall 204 of waveguides 220a, 220b, 242a and 242b is such that, under normal cooking conditions, approximately more than ⅓% of the microwave energy is available below each cooking racks 208a and 208b, with the balance of microwave energy available above cooking racks 208a and 208b.

Metal cooking devices such as cooking pans, cookie sheets and other metal cookware is traditionally used in conventional cooking. Because microwave energy cannot penetrate these metal devices, all of the microwave energy must enter the top and side surfaces of the food product. To overcome the issue that metal pans create, some ovens utilize a top launch microwave system. The theory has been to provide microwave energy through the top surface of the food product, but this application of microwave power applies excessive microwave energy to the top of the product, causing over cooking, producing a tough, rubbery food product. The overcooking problem is especially acute when cooking proteins, such as meat. In order to prevent this microwave overcook condition, one method historically utilized was a reduction of the microwave energy that is available for cooking the food product. The result of limiting the microwave energy to the food product is that the microwave energy is more evenly distributed over the cook cavity, but this reduction in applied microwave energy results in a slower cook process, defeating the desire for a speed cooking oven.

Figure 17:
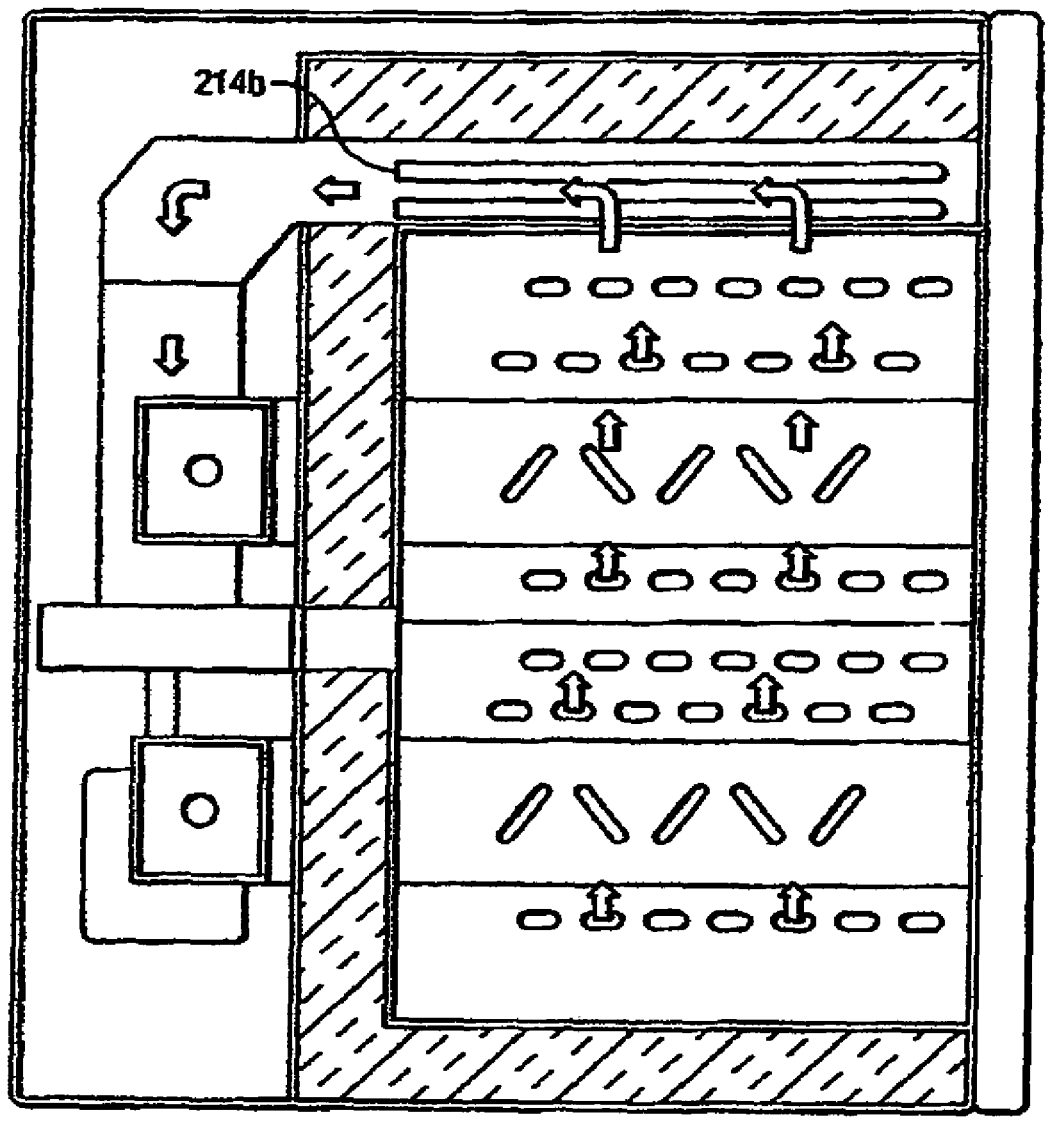
FIG. 17 is a front view of right side of oven illustrating microwave system

Other methods of distributing microwave energy launch microwave energy from below the food product. This is not optimum because microwave energy that is to enter the upper surface of the food product must bounce around within the oven cavity in a random and inefficient manner in order to enter the top side of the food. As shown in FIG. 17, microwave energy is broadcast from waveguides 220a, 220b, 246a and 246b into oven cavity 202 via a slotted antenna wherein four narrow apertures (slots) 270a, 270b, 270c, 270d and 270e are spaced alone the waveguide. Various configurations for microwave distribution have been utilized with varying results and the design is not required or limited to the five slots as illustrated. Indeed, fewer slots or more slots may be utilized depending upon the length of the microwave launcher and the desired electromagnetic energy field that is required. Food products 210a and 210b are placed within oven cavity 202 a distance of at least 2.4 inches (for optimal cooking uniformity) from left side wall 205 or right side wall 206. The 2.45 inch measurement corresponds to one half a microwave wavelength or 2.4 inches (for optimal cooking uniformity) (E field null) for a 2.45 GHz microwave tube (microwave) frequency. This spacing permits the E-field to expand and become more uniform prior to coupling with the food product. The left and right microwave systems are identical and illustrated in FIG. 16.

The microwave energy field therefore propagates through the oven cavity in an evenly distributed pattern, coupling with the food product from all directions, and providing an even electromagnetic energy distribution throughout the oven cavity without the need for a mechanical stirrer to propagate the electromagnetic field.

Waveguides 220a, 220b, 246a and 246b are located on the left and right side walls of the oven, and therefore do not interfere with oven cavity spent gas exhaust and are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip.

As seen in FIG. 16, bottom wall 204 has a smooth, continuous bottom that is easy to clean with no heating elements, air return ducts or microwave launchers within the oven cavity floor. In instances where air return means, heating elements and microwave launchers protrude through the oven floor it is very difficult for an operator to clean and maintain the oven in a sanitary condition. In a bottom launch microwave system, the waveguide launcher is generally located within the center portion of the oven cavity bottom wall. As grease, oils and other by-products of the cooking process are released during normal cooking, they drip and splatter onto the microwave launcher. The launcher must be protected and is covered with a microwave transparent material such as quartz and sealed with adhesives or other sealants in an effort to prevent contaminants from entering the launcher, causing pre-mature breakdown of the magnetron. Additionally, some speed cook ovens have located upon the bottom wall a radiant element to assist with bottom side browning. For commercial applications an exposed lower radiant element may result in safety issues as grease builds up around the hot element.

The present invention utilizes a smooth oven cavity floor that does not allow for the contamination of the microwave system, the gas re-circulating system or the wave guide launcher by grease and other by products of the cooking process that drip or spill from the cooking containers. Gas discharge plates 223a and 223b, FIG. 16 are located in the corners of the oven with the apertures 229a, 229b located above the oven floor. As such, the bottom of the oven cavity is left as a continuous, unencumbered surface. Apertures 229a and 229b are positioned above oven bottom wall 204 and cleaning of the oven floor is therefore easily achieved. Additionally, plates 227a and 227b can be manufactured to be removable from lower gas transfer sections 218a and 218b for cleaning or replacement. Radiant elements 203a and 203b, are located within gas transfer sections 218a, and 218b and will therefore not be contaminated by food spills, grease and cooking by-products that splatter and drop from the cooking rack.

To summarize, the present invention provides for a speed cooking oven utilizing hot gas flows, hot gas flows coupled with microwave energy in order to achieve speed cooking of food products five to ten times faster than conventional cooking methods, and at quality, taste and appearance levels that are equal to and exceed conventional cooking. In the various versions, the oven is operable on standard commercial power supplies and is simple and economical to manufacture, use and maintain, and is directly scalable to larger or smaller commercial and larger or smaller residential embodiments. The speed cooking oven may operate as a speed cooking air only oven, a microwave oven or a combination air and microwave speed cooking oven.

Although the present invention has been described in considerable detail with reference to certain preferred versions thereof, other versions are possible. For example, various sizes of commercial and residential speed cooking ovens may be made. In these cases larger or smaller component parts may be utilized and fewer or more components may be employed. In the case where it is desirable to make a smaller speed cooking oven, one gas flow acceleration means may be utilized instead of two; one microwave system utilized instead of two; smaller or fewer thermal devices, whether electric resistance or gas fired may be used. In cases wherein it is desirable for a larger speed cooking oven, multiple rack units may be developed and additional gas flow systems and microwave systems may be added to accomplish a larger cavity, multi rack speed cooking oven. Apertures may be made larger or smaller depending upon the gas flow requirements of a practiced version. The heating means may be combined into one heating element, or more than two heating elements may be utilized.

Any element in a claim that does not explicitly state "means for" performing a specific function, or "step for" performing a specific function, is not to be interpreted as a "means" or "step" clause as specified in 35 U.S.C. §112, ¶6. In particular, the use of "step" of in the claims herein is not intended to invoke the provisions of 35 U.S.C. §112, Other modifications and improvements thereon will become readily apparent to those skilled in the art. Accordingly, the spirit and scope of the present invention is to be considered broadly and limited only by the appended claims, and not by the foregoing specification.

Other modifications and improvements thereon will become readily apparent to those skilled in the art. Accordingly, the spirit and scope of the present invention is to be considered broadly and limited only by the appended claims, and not by the foregoing specification.

I claim:

1. A speed cooking oven for cooking a food product by hot gas and microwave energy, said oven comprising:
   (a) an oven cavity for containing said food product, said oven cavity having a bottom;
   (b) a conduit means associated with the cooking chamber, said conduit means providing for the circulation of the gas to and from the cooking chamber;
   (c) a variable speed blower motor for causing circulation of the gas;
   (d) a thermal means for heating the gas;
   (e) a control means for controlling the gas;
   (f) a first gas directing means associated with the conduit means and disposed above the food product and above said bottom of the oven cavity;
   (g) a second gas directing means associated with the conduit means disposed above the food product and above said bottom of the oven cavity, wherein the first and second gas directing means are configured to cause the gas from the first gas directing means to collide with the gas from the second gas directing means upon the upper surface of the food product;
   (h) a third gas directing means associated with the conduit means and disposed below the food product and above said bottom of the oven cavity;
   (i) a fourth gas directing means associated with the conduit means disposed below the food product and above said bottom of the oven cavity, wherein the third and fourth gas directing means are configured to cause the gas from the third gas directing means to collide with the gas from the fourth gas directing means upon the bottom surface of the food product;
   (j) microwave waveguides disposed above said bottom of the oven cavity for launching microwave energy into the oven cavity:
   (k) wherein said bottom of the oven cavity is smooth and continuous with no heating elements, air ducts or microwave launchers to facilitate easy cleaning of the bottom of the oven cavity.

2. The speed cooking oven according to claim 1, wherein the gas is circulated at a velocity of about 2000 feet per minute or higher.

3. The speed cooking oven according to claim 1, wherein the gas is circulated at a velocity of about 6000 feet per minute or lower.

4. The speed cooking oven according to claim 1, wherein the gas is circulated at a velocity in the range between about 2000 feet per minute and 6000 feet per minute.

5. The speed cooking oven according to claim 1, wherein the gas is circulated at a velocity of up to 2000 feet per minute.

6. The speed cooking oven according to claim 1, wherein the gas is circulated at a velocity of 6000 feet per minute or higher.

7. The speed cooking oven according to claim 4 wherein said first and second gas directing means direct gas from opposite sides of the oven cavity.

8. The speed cooking oven according to claim 7 wherein said microwave waveguides launch microwave energy from said opposite sides of the oven cavity.

* * * * *